(12) United States Patent
Chen et al.

(10) Patent No.: US 9,493,177 B1
(45) Date of Patent: Nov. 15, 2016

(54) TAKEDOWN UTILITY CART HAVING DRAWERS AND A LOCK ASSEMBLY

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE CO., LTD, Taichung (TW)

( * ) Notice: Subject to any disclaimer, the term of this patent is extended or adjusted under 35 U.S.C. 154(b) by 0 days.

(21) Appl. No.: 14/817,691

(22) Filed: Aug. 4, 2015

(51) Int. Cl.
| | |
|---|---|
| *B62B 1/00* | (2006.01) |
| *B62B 3/00* | (2006.01) |
| *A47B 81/00* | (2006.01) |
| *A47B 91/00* | (2006.01) |
| *B60B 33/00* | (2006.01) |

(52) U.S. Cl.
CPC ............... *B62B 3/005* (2013.01); *A47B 81/00* (2013.01); *A47B 91/00* (2013.01); *B60B 33/0002* (2013.01)

(58) Field of Classification Search
CPC .... A47B 13/14; A47B 67/04; A47B 87/008; A47B 95/043; A47B 57/50
See application file for complete search history.

(56) References Cited

U.S. PATENT DOCUMENTS

| | | | | |
|---|---|---|---|---|
| 3,610,429 A * | 10/1971 | MacKay | ................ | A47B 13/14 108/109 |
| 3,862,691 A * | 1/1975 | Mori | .................... | A47B 57/408 108/156 |
| 4,331,369 A * | 5/1982 | Lazar | ................. | A47B 88/0422 312/334.8 |
| 5,011,240 A * | 4/1991 | Kelley | ................... | A47B 31/00 312/249.12 |
| 5,938,367 A * | 8/1999 | Olson | .................... | A47B 57/50 211/192 |
| 7,044,569 B1 * | 5/2006 | Relyea | .................. | A47B 67/04 280/47.35 |
| 8,602,443 B2 * | 12/2013 | Moore | ................... | B62B 3/002 280/651 |
| 8,672,150 B2 * | 3/2014 | Chen | ..................... | A47B 57/50 108/147.16 |
| 9,241,566 B1 * | 1/2016 | Chen | ..................... | A47B 57/38 |
| 2002/0027116 A1 * | 3/2002 | Herzog | ................. | A47B 57/50 211/192 |
| 2005/0140106 A1 * | 6/2005 | Huguet | ............... | A47B 95/043 280/79.3 |
| 2005/0212241 A1 * | 9/2005 | Stone | .................. | A47B 87/008 280/79.3 |
| 2005/0248109 A1 * | 11/2005 | Chang | .................. | A47B 67/04 280/79.3 |
| 2015/0076779 A1 * | 3/2015 | Lindblom | ............... | A47F 5/137 280/47.35 |

* cited by examiner

*Primary Examiner* — Hau Phan

(57) ABSTRACT

A takedown utility cart includes four corner members each including joining apertures; four rectangular interconnecting members each shaped as a groove having two bent ends, each interconnecting member including two joining apertures at two sides respectively wherein a retainer is driven through the joining apertures to fasten the corner member and the interconnecting member together; two side walls each including a rectangular panel, two joining members at front and rear ends of the panel respectively, and two joining apertures on the joining member wherein a retainer is driven through the joining apertures to fasten the corner member and the side wall together; a rectangular platform disposed on the bent ends; a rectangular rear panel including four joining apertures at respective corners thereof wherein a retainer is driven through the joining apertures to fasten the corner member and the rear panel together; and at least one drawer.

4 Claims, 31 Drawing Sheets

TAKEDOWN UTILITY CART HAVING DRAWERS AND A LOCK ASSEMBLY

BACKGROUND OF THE INVENTION

1. Field of the Invention

The invention relates to carts and more particularly to a takedown utility cart having drawers and a lock assembly.

2. Description of Related Art

Takedown devices are widely manufactured for the sakes of saving space and thus decreasing transport cost.

U.S. Pat. No. 8,672,150 entitled "modular shelving" is invented by the present inventors. The patent discloses an adjustable shelving assembly having corner members, interconnecting members, retainers and lock pins for releasably securing them together. However, there are no drawers provided by the patent and various tools cannot be stored for use. Further, no locking devices are provided even when drawers are installed in the cabinet. Thus, the drawers may be pulled out of the cabinet if sufficient care is not taken in use. Further, tools in the drawer may fall on the ground to cause injury to an individual opening the drawer. Thus, the need for improvements still exists.

SUMMARY OF THE INVENTION

It is therefore one object of the invention to provide a takedown utility cart comprising four corner members having an L-shaped cross-section, each corner member including two supports formed together, each support having a plurality of spaced joining apertures; a plurality of retainers; at least one set of four rectangular interconnecting members, each interconnecting member being shaped as an elongated groove having two bent ends, each interconnecting member including two joining apertures at two sides respectively wherein each retainer is configured to drive through the joining aperture and the corresponding joining aperture to fasten the corner member and the interconnecting member together; two side walls each including a rectangular panel, two joining members at front and rear ends of the panel respectively, and two joining apertures on the joining member wherein each retainer is configured to drive through the joining aperture and the corresponding joining aperture to fasten the corner member and the side wall together; at least one rectangular platform each disposed on the bent ends of the interconnecting members; at least one rectangular rear panel each including four joining apertures at respective corners thereof wherein each retainer is configured to drive through the joining aperture and the corresponding joining aperture to fasten the corner member and the rear panel together; at least one set of two slides on inner surfaces of the side walls; and at least one drawer each configured to slidably secure to the slides of the same set.

The above and other objects, features and advantages of the invention will become apparent from the following detailed description taken with the accompanying drawings.

DETAILED DESCRIPTION OF THE INVENTION

Figure 1:
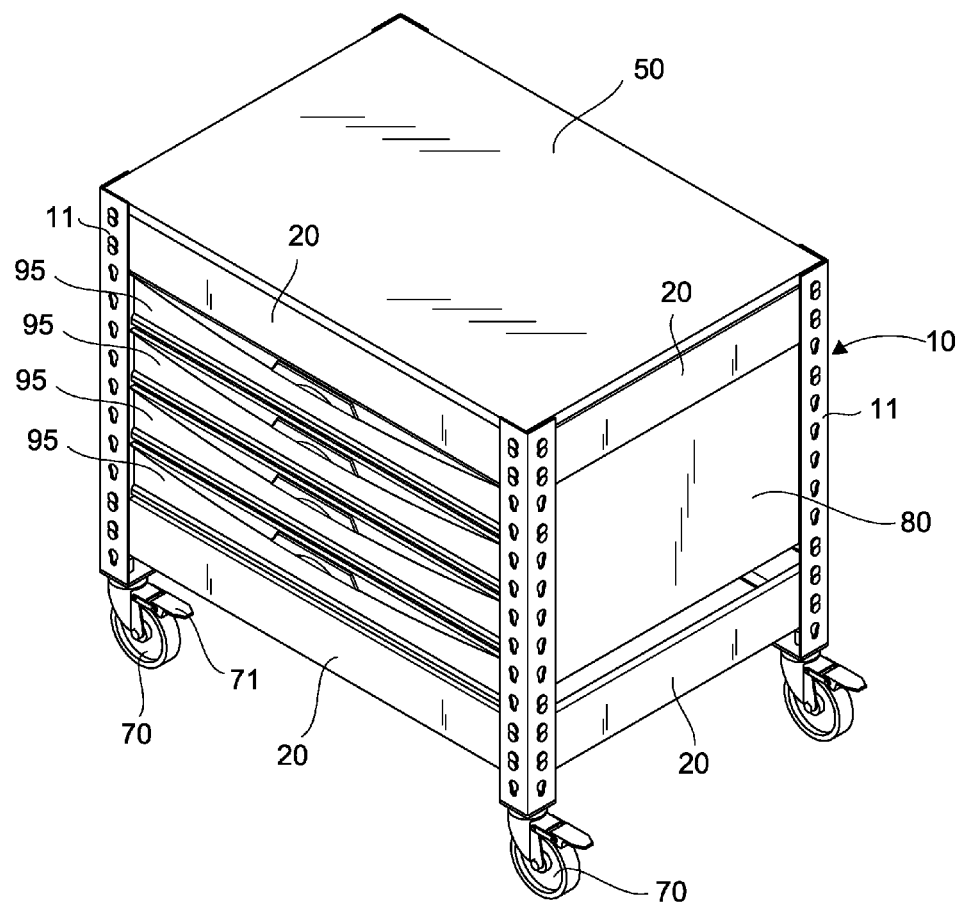
FIG. 1 is a perspective view of a takedown utility cart according to a first preferred embodiment of the invention.
Figure 2:
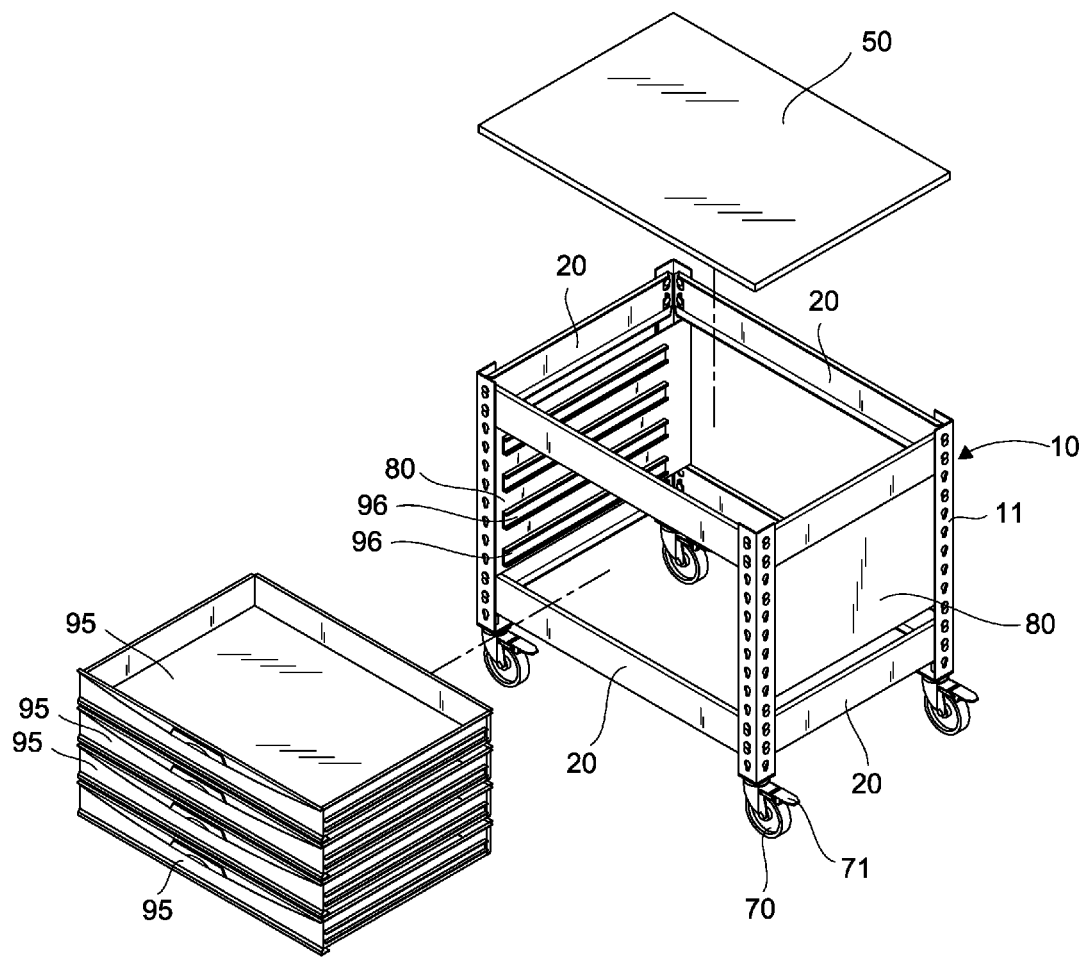
FIG. 2 is an exploded view of the takedown utility cart.
Figure 3:
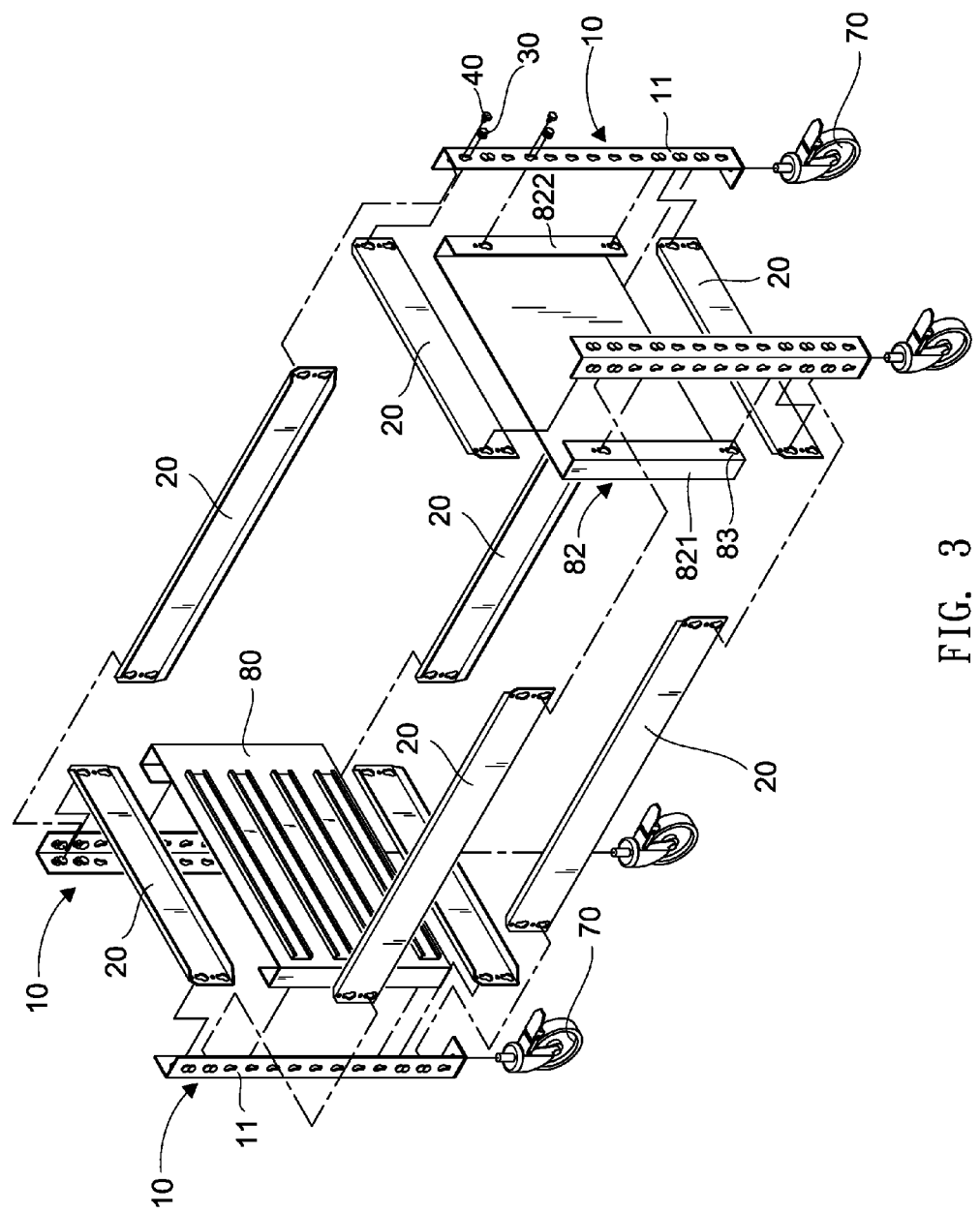
FIG. 3 is an exploded view of the frame of the takedown utility cart.
Figure 3A:
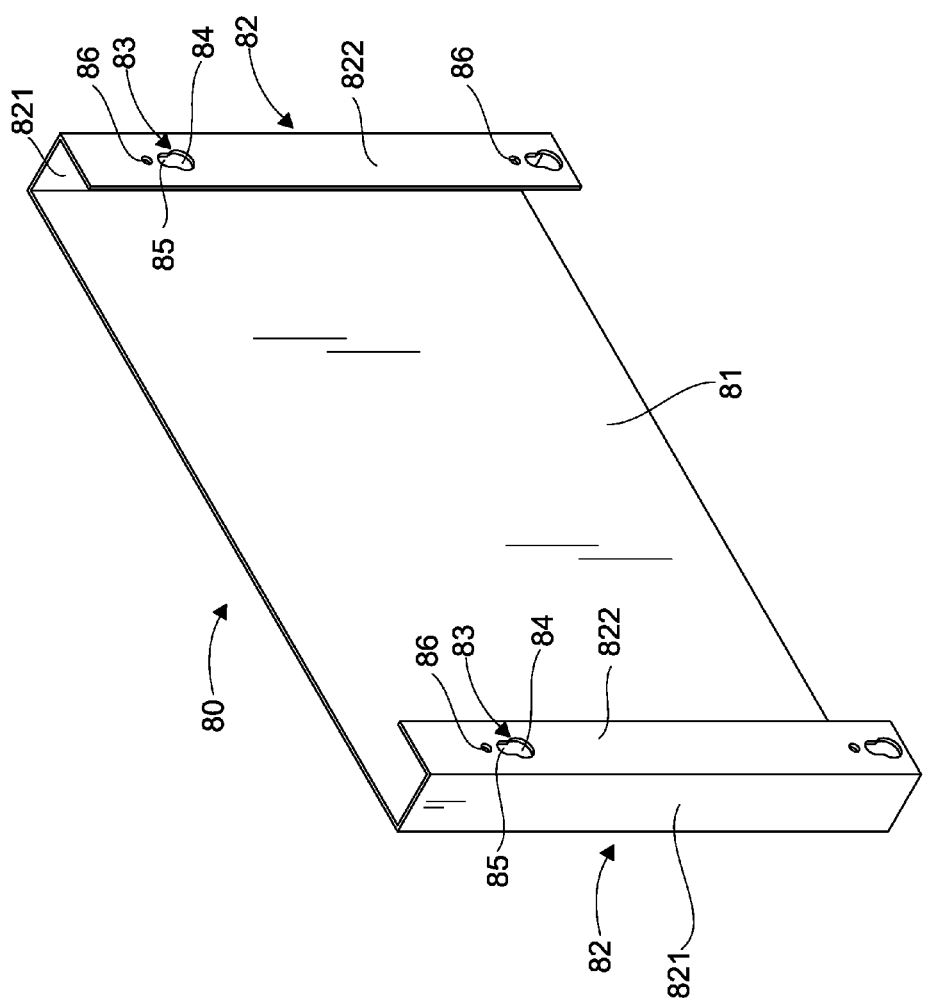
FIG. 3A is a perspective view of the side wall.
Figure 4:
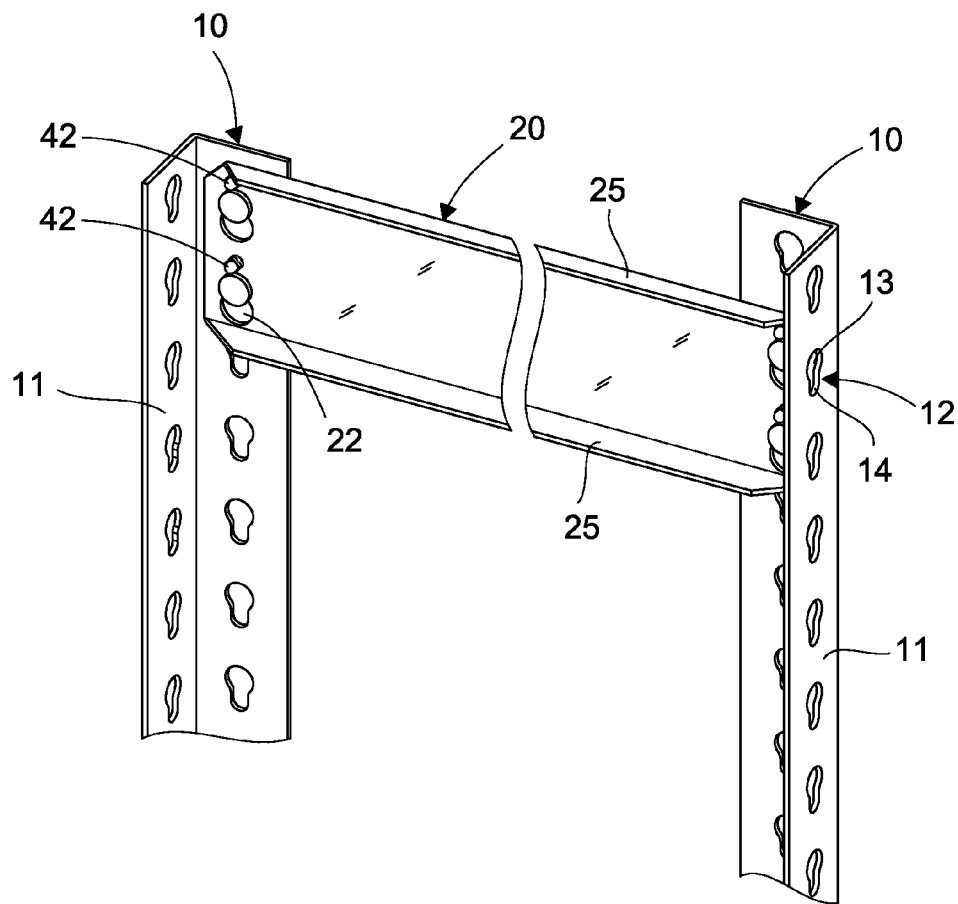
FIG. 4 is a perspective view of the assembled corner members and interconnecting member.
Figure 5:
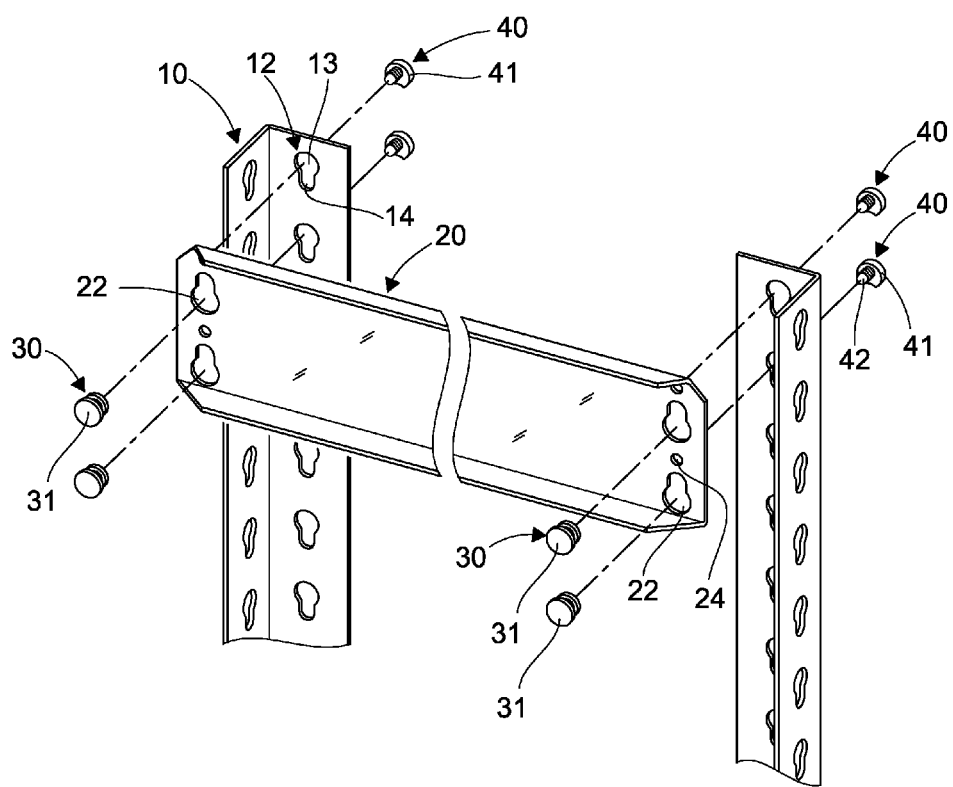
FIG. 5 is an exploded view of FIG. 4.
Figure 6:
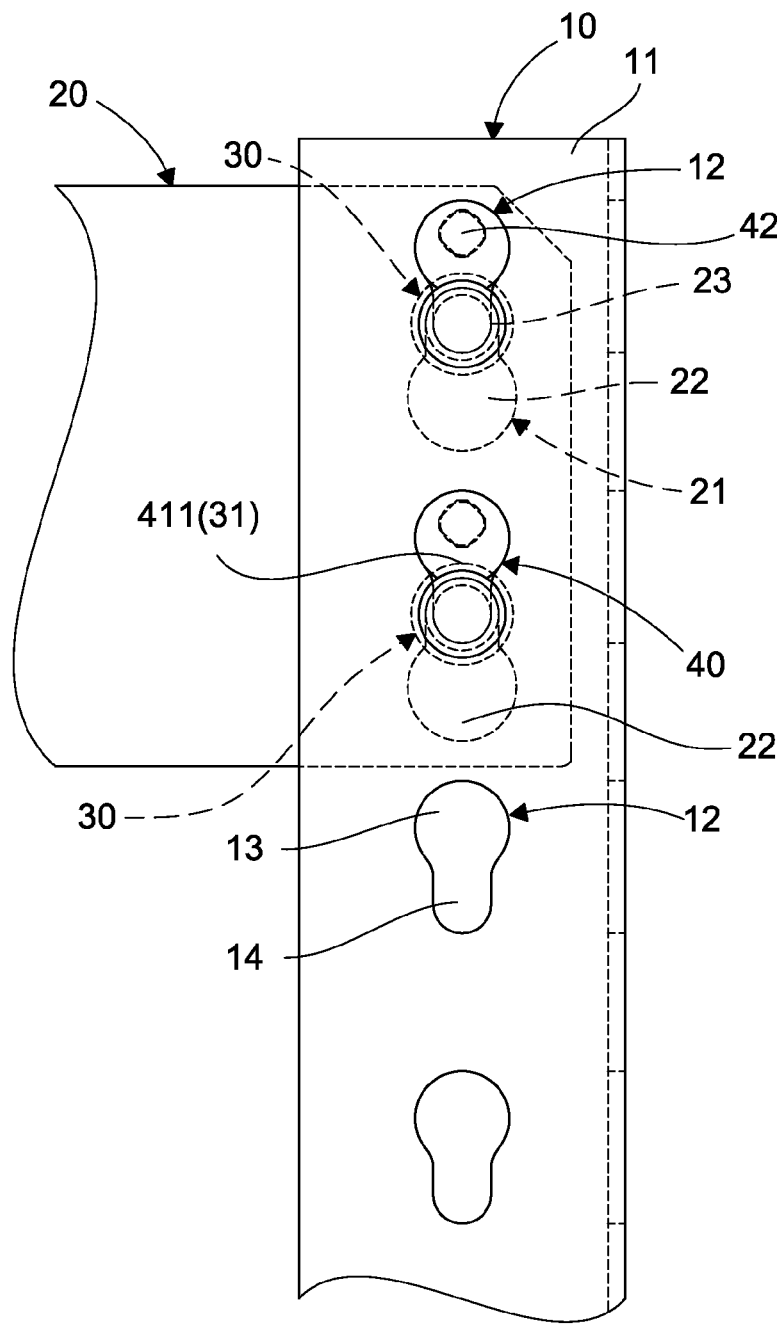
FIG. 6 is a plan view showing the interconnecting member and the corner member being fastened.
Figure 7:
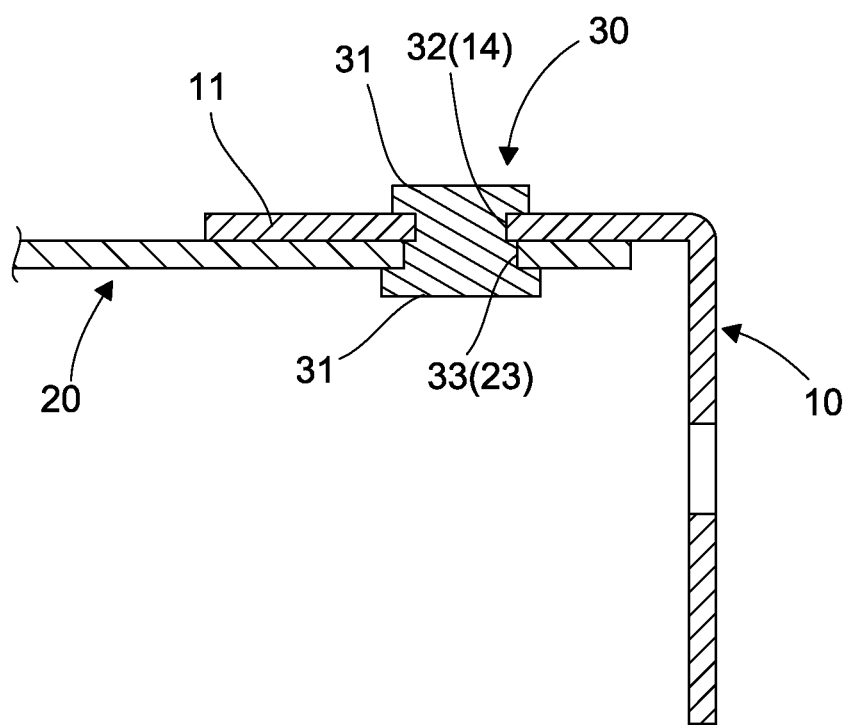
FIG. 7 is a cross-sectional view of one corner of the utility cart shown in FIG. 1.
Figure 8:
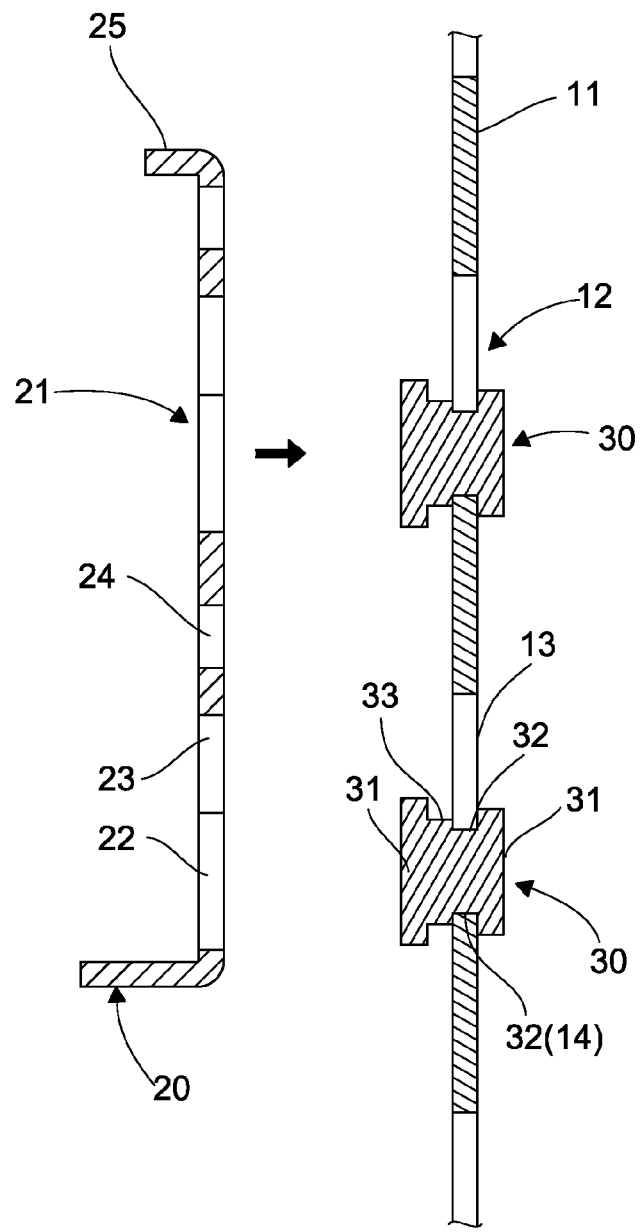
FIGS. 8, 9 and 10 are longitudinal sectional views showing the fastening steps of the interconnecting member and the corner member.
Figure 9:
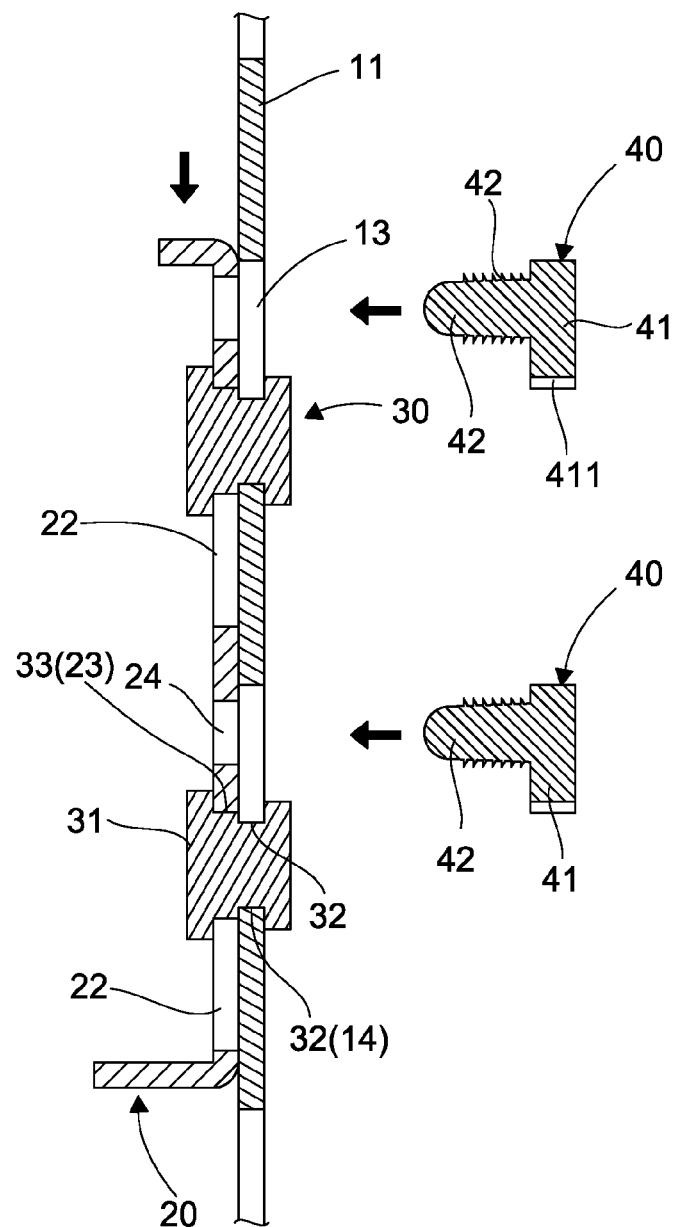
Figure 10:
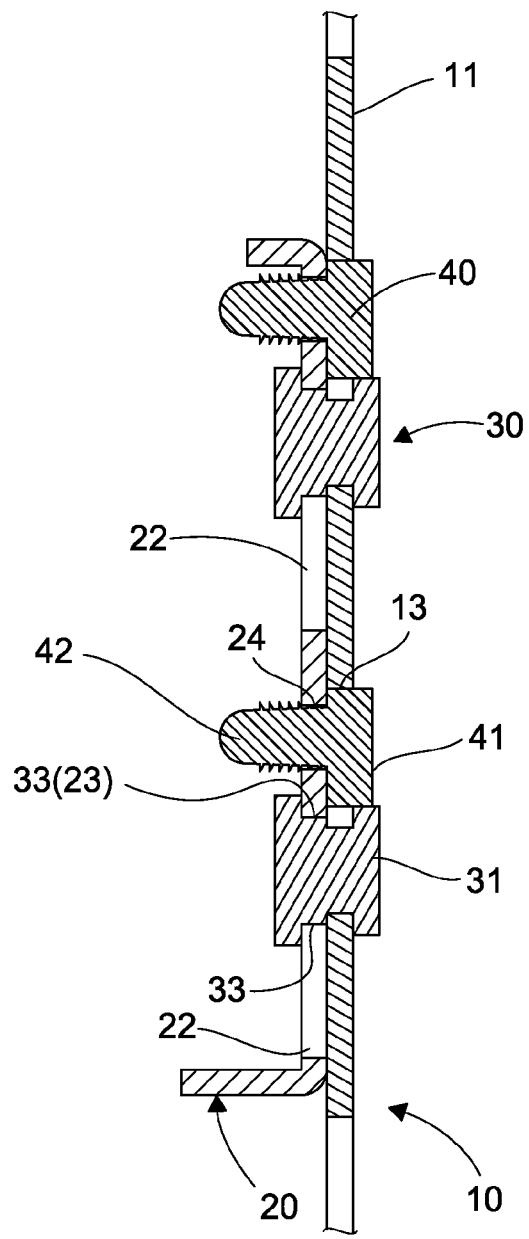

Referring to FIGS. 1 to 13, a takedown utility cart in accordance with a first preferred embodiment of the invention comprises the following components as discussed in detail below.

Four corner members 10, four interconnecting members 20, a lock assembly 50 on a top, two side walls 80, a plurality of drawers 95, a plurality of retainers 30, a plurality of lock pins 40, and four wheels 70 are provided. The wheel 70 has a wheel lock 71 for locking the wheel 70 to positioning the takedown utility cart after moving to a desired place.

The corner member 10 is of L-shaped cross-section and includes two supports 11 formed together, each support 11 including a plurality of equally spaced joining apertures 12 formed lengthwise. The first joining aperture 12 is shaped as an inverted teardrop and includes an upper larger circle 13 and a lower smaller hole 14 overlapping the larger circle 13. The interconnecting member 20 is an elongated groove having two 90-degree bent ends 25. On either end of the interconnecting member 20, there are provided two second joining apertures 21 and two first through holes 24 each above the second joining aperture 21. The second joining aperture 21 is shaped as a teardrop and includes an first upper smaller hole 23 and a first lower larger circle 22 overlapping the first upper smaller hole 23. The second joining aperture 21 is an inverted image of the first joining aperture 12. Size of the first upper smaller hole 23 is greater than that of the smaller hole 14. The first through hole 24 is aligned with the larger circle 13.

The retainer 30 is shaped as a barbell and includes two enlargements 31 at both ends respectively, an annular groove 32 adjacent to one enlargement 31, and an annular trough 33 between the groove 32 and the other enlargement 31. The groove 32 is recessed further than the trough 33. The lock pin 40 includes a curved head 41 and a shaft 42 extending from a center of the head 41. The shaft 42 has a diameter smaller than that of the head 41. The head 41 has a diameter about the same as that of the larger circle 13. The head 41 includes a concave portion 411 on an edge. The shaft 42 includes a ridge portion 421 on a surface. The shaft 42 has a diameter about the same as that of the first through hole 24 and a length greater than that of the first through hole 24.

In an assembly, the larger circle 13 is aligned with the first lower larger circle 22. Next, the retainer 30 is inserted through the first lower larger circle 22 and the larger circle 13 until the other enlargement 31 contacts the interconnecting member 20. Further, the retainer 30 is pressed down until the groove 32 is rested upon the smaller hole 14. Furthermore, the interconnecting member 20 is pressed down until the first upper smaller hole 23 tightly engages the trough 33. Next, the lock pin 40 is inserted into the larger circle 13 with the shaft 42 passing through the first through hole 24 until being stopped. The ridge portion 421 urges against the first through hole 24 for fastening them together. Further, the head 41 of the lock pin 40 is partially disposed in the larger circle 13, and the concave portion 411 of the head 41 of the lock pin 40 is rested upon one enlargement 31 adjacent to the groove 32. As a result, the corner members 10 and the interconnecting member 20 are fastened together. In addition, the platform 50 is secured onto the bent ends 25 of the interconnecting members 20.

The side wall 80 includes a rectangular panel 81 and two joining members 82 at front and rear ends of the panel 81 respectively. The joining member 82 has a cross-section of U and includes a first part 821 formed with the panel 81, and a second part 822 bending about 90-degree inward. The side wall 80 further includes two third joining apertures 83 on each second part 822. The third joining aperture 83 is shaped as a teardrop and includes a second lower larger circle 84 and an second upper smaller hole 85 overlapping the second lower larger circle 84. Size of the second upper smaller hole 85 is greater than that of the smaller hole 14 of the first joining aperture 12. The side wall 80 further includes two second through holes 86 on each second part 822. The second through hole 86 is disposed above and adjacent to the third joining aperture 83. The second through hole 86 is aligned with the larger circle 13 of the support 11. A plurality of horizontal slides 96 are provided on an inner surface of each side wall 80. Thus, the drawers 95 can be slidably disposed in an interior of the takedown utility cart.

Figure 11:
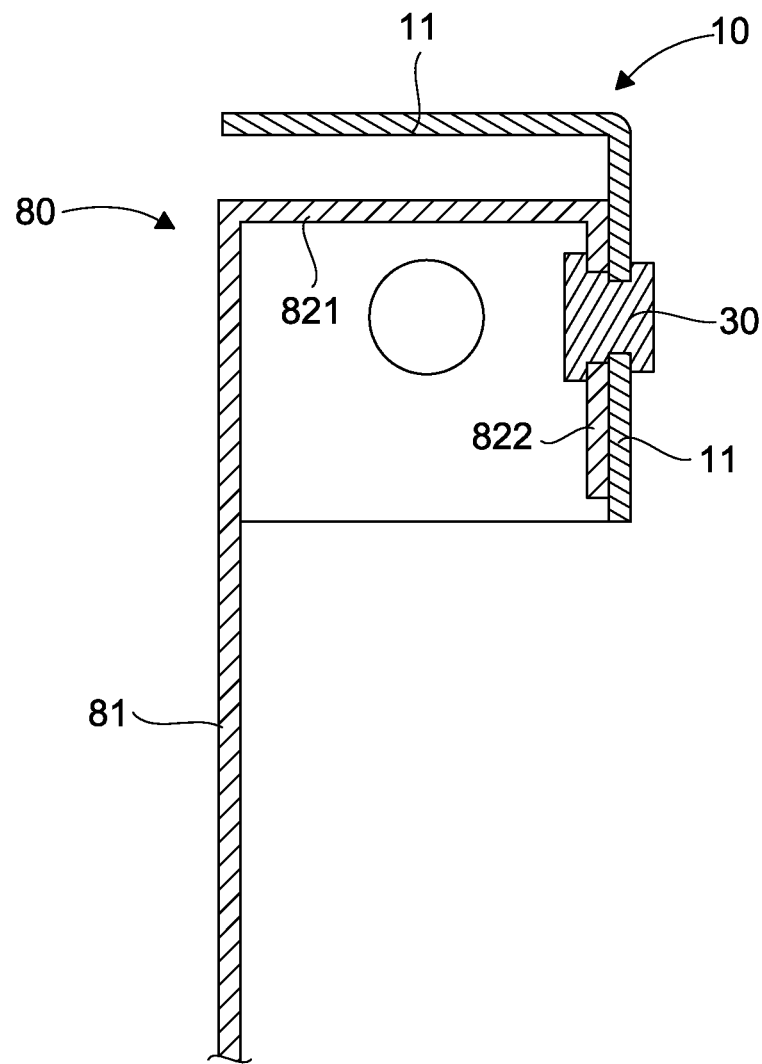
FIG. 11 is a cross-sectional view of the corner member and the side wall fastened by the retainer.
Figure 12:
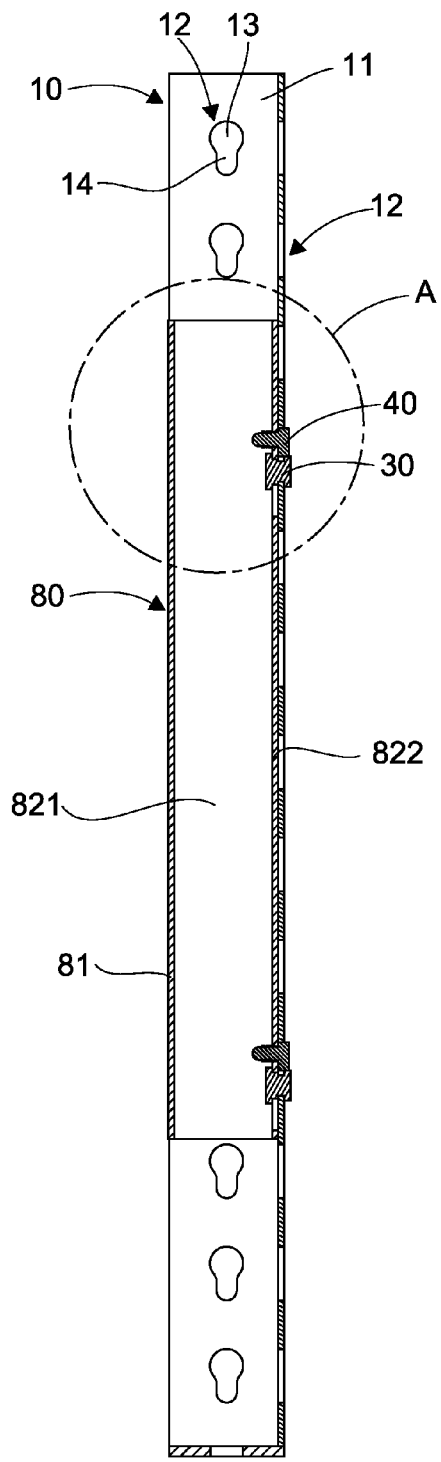
FIG. 12 is a longitudinal sectional view of the side wall and the corner member shown in FIG. 1.
Figure 13:
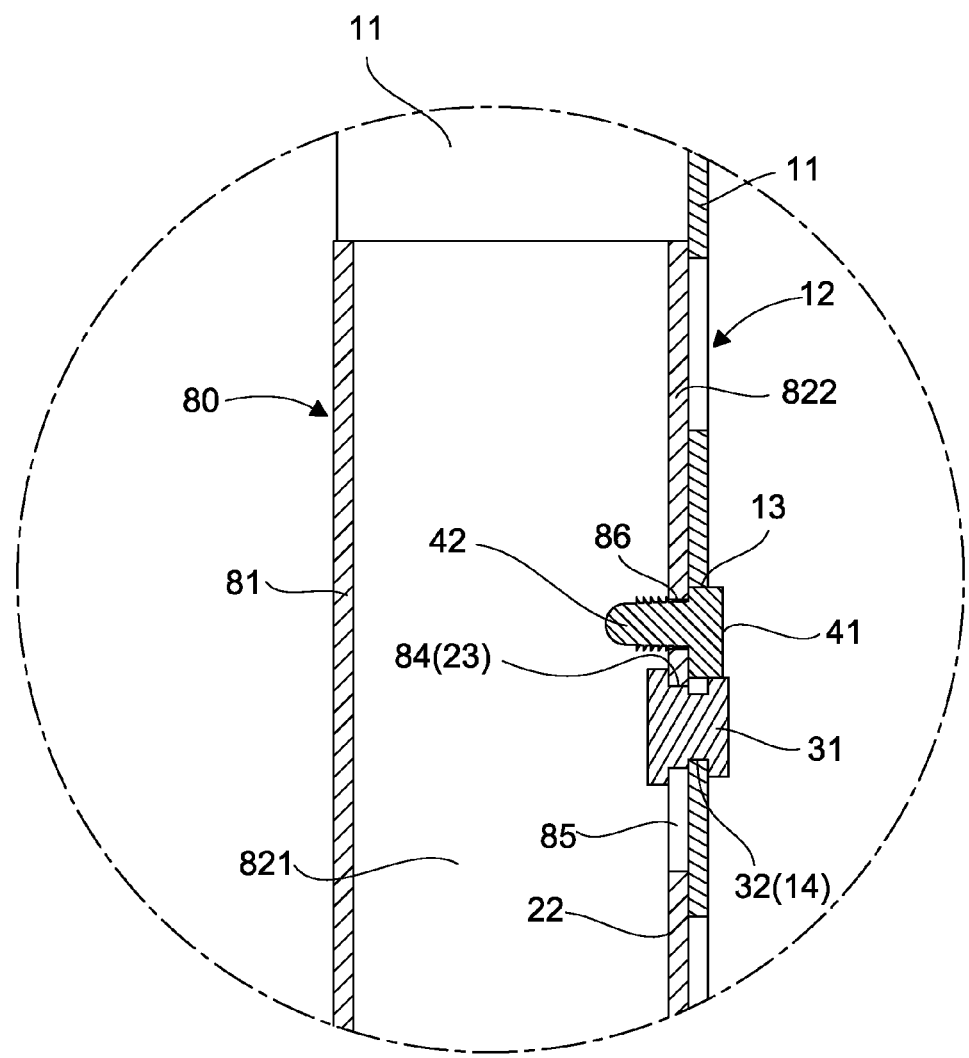
FIG. 13 is a detailed view of the area in circle A of FIG. 12.
Figure 14:
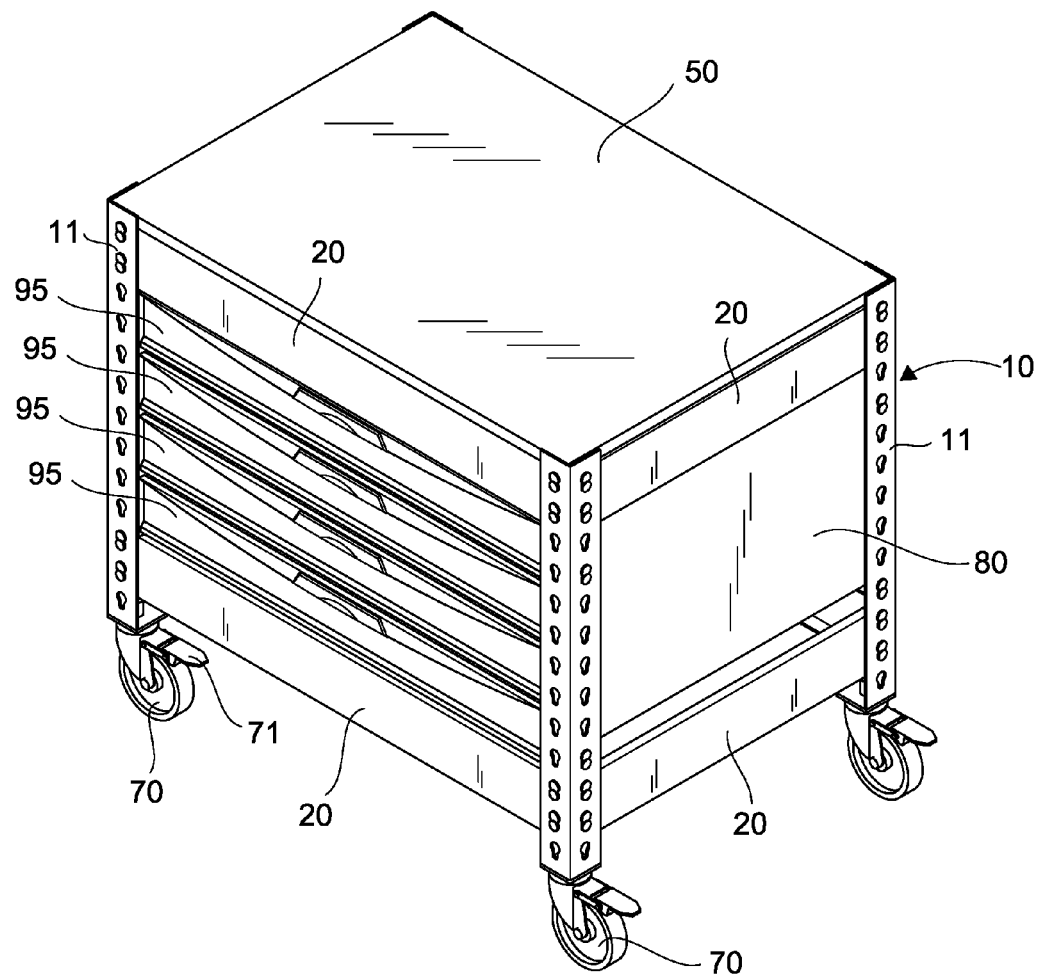
FIG. 14 is a perspective view of a takedown utility cart according to a second preferred embodiment of the invention.
Figure 15:
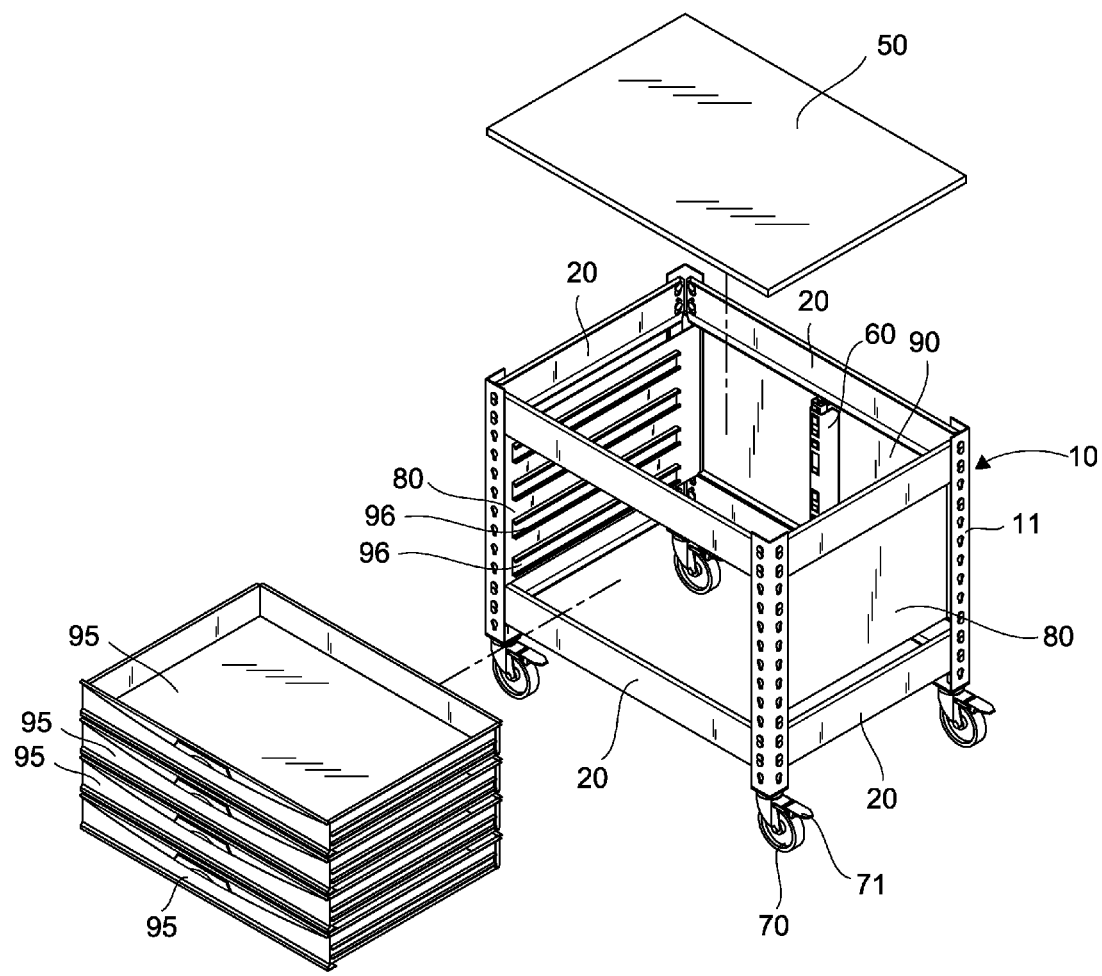
FIG. 15 is an exploded view of the takedown utility cart shown in FIG. 14.
Figure 15A:
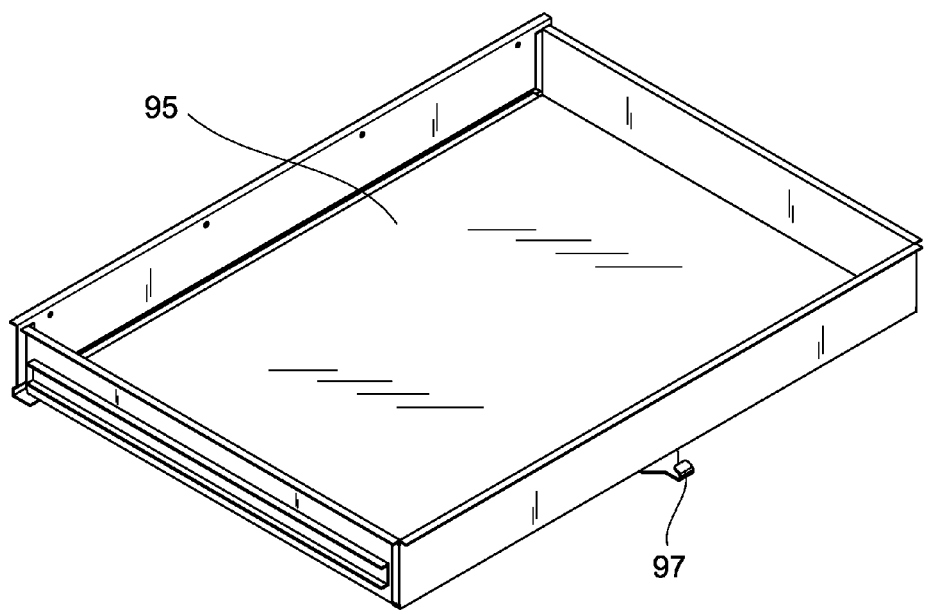
FIG. 15A is a perspective view of the drawer.
Figure 16:
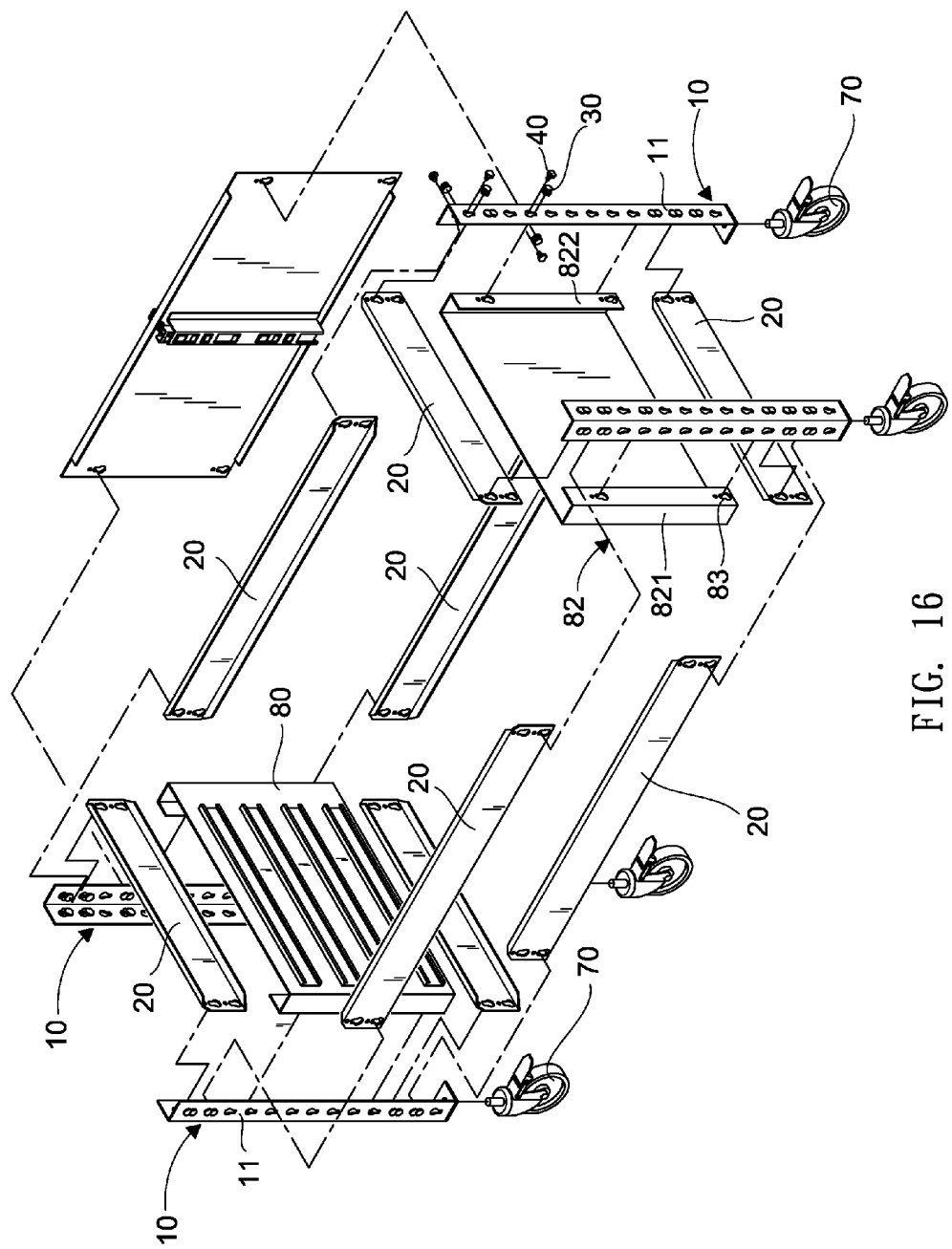
FIG. 16 is an exploded view of the frame of the takedown utility cart shown in FIG. 14.

As shown in FIGS. 11, 12 and 13, in an assembly, the larger circle 13 is aligned with the second lower larger circle 84. Next, the retainer 30 is inserted through the second lower larger circle 84 and the larger circle 13 until the other enlargement 31 being stopped. Further, the retainer 30 is pressed down until the groove 32 is rested upon the smaller hole 14. Furthermore, the side wall 80 is pressed down until the second upper smaller hole 85 tightly engages the trough 33. Next, the lock pin 40 is inserted into the larger circle 13 with the shaft 42 passing through the second through hole 86 until being stopped. The ridge portion 421 urges against the second through hole 86 for fastening them together. Further, the head 41 of the lock pin 40 is partially disposed in the larger circle 13, and the concave portion 411 of the head 41 of the lock pin 40 is rested upon one enlargement 31 adjacent to the groove 32. As a result, the corner member 10 and the side wall 80 are fastened together.

Referring to FIGS. 14 to 23, a takedown utility cart in accordance with a second preferred embodiment of the invention is shown. The characteristics of the second preferred embodiment are substantially the same as that of the first preferred embodiment except the following: A rear panel 90 is provided. The drawer 95 includes a projecting snapping member 97 on a rear end. A lock assembly 60A is mounted on the rear panel 90. In detail, the rear panel 90 is rectangular and includes four sets of a fourth joining aperture 91 and a third through hole 94 at four corners thereof. The third through hole 94 is disposed above and adjacent to the fourth joining aperture 91. The fourth joining aperture 91 is shaped as a teardrop and includes a third lower larger circle 92 and an third upper smaller hole 93 overlapping the third lower larger circle 92. Size of the third upper smaller hole 93 is greater than that of the smaller hole 14 of the first joining aperture 12. The third through hole 94 is aligned with the larger circle 13 of the support 11.

Figure 17:
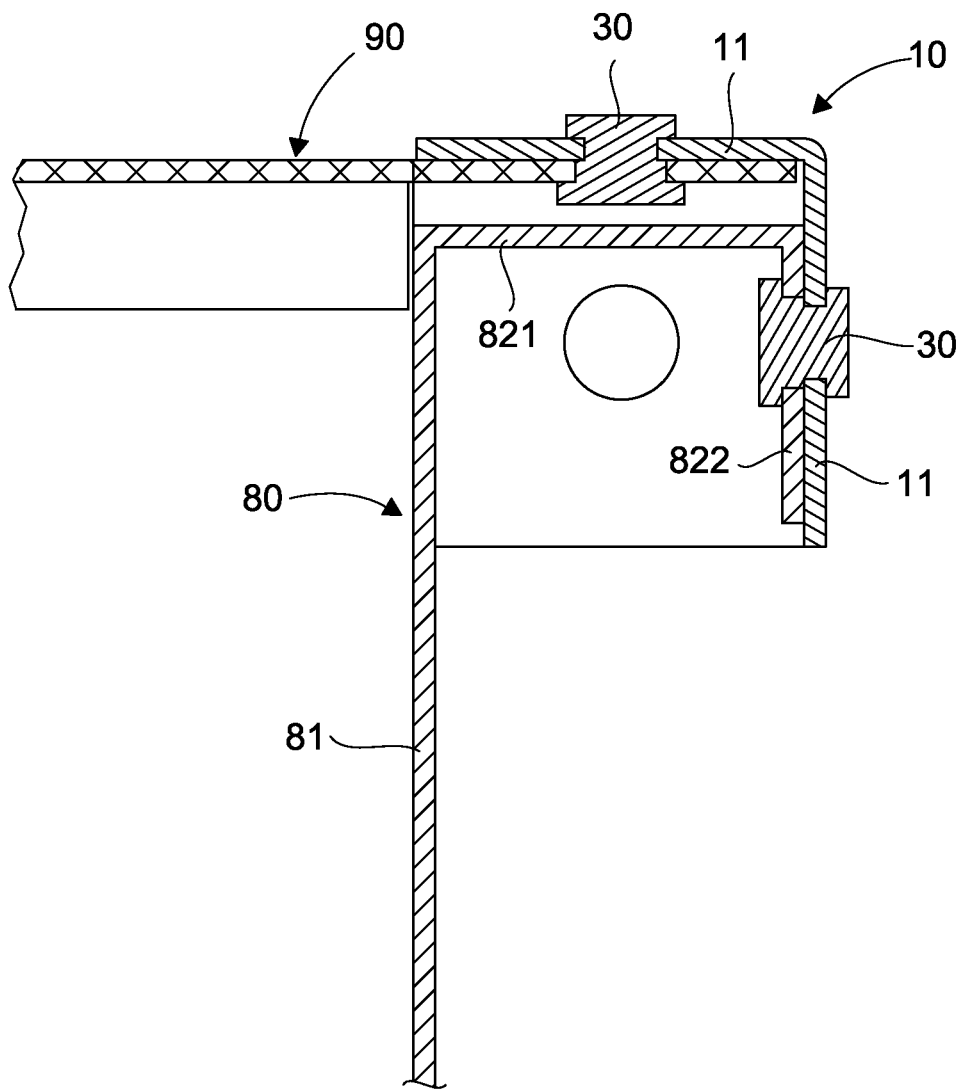
FIG. 17 is a cross-sectional view of one corner of the takedown utility cart shown in FIG. 14.
Figure 18:
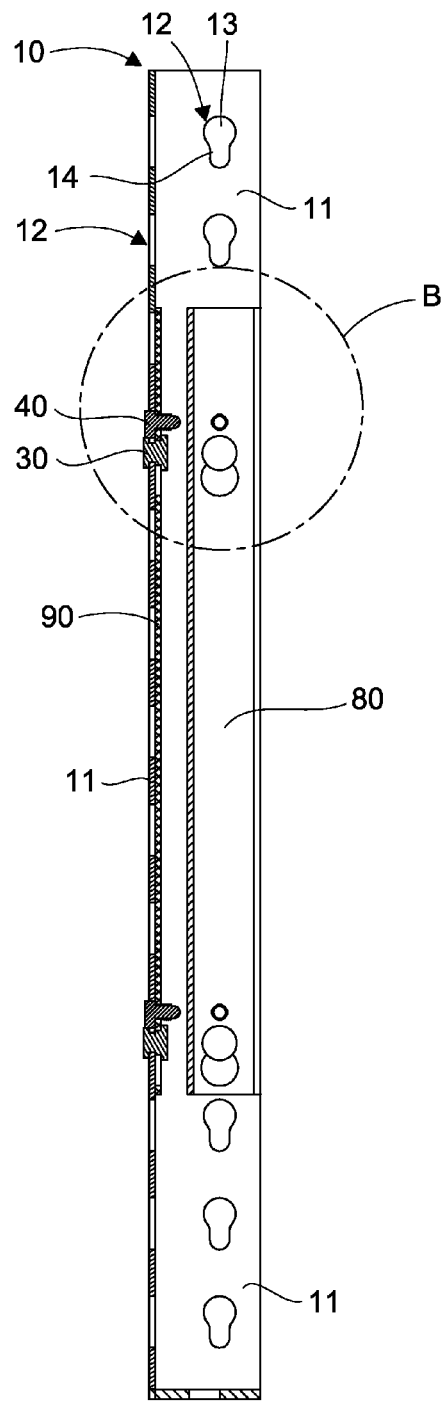
FIG. 18 is a longitudinal sectional view of the side wall and the corner member shown in FIG. 14.
Figure 19:
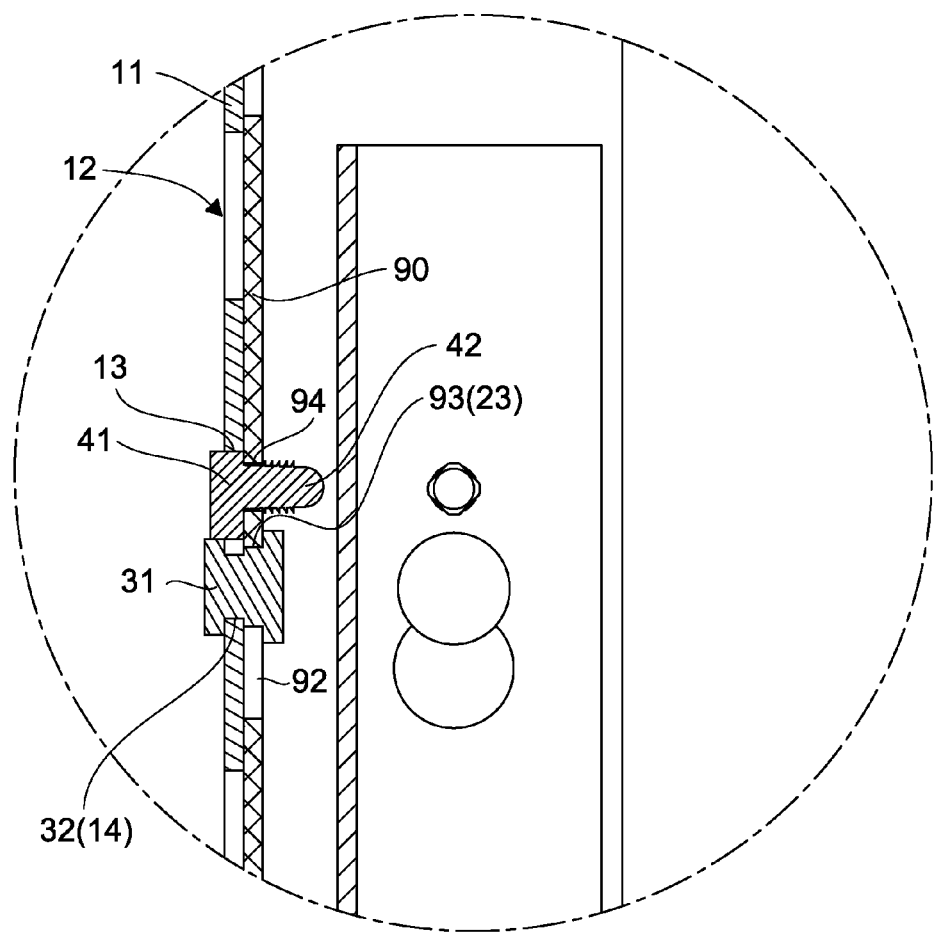
FIG. 19 is a detailed view of the area in circle B of FIG. 18.
Figure 20:
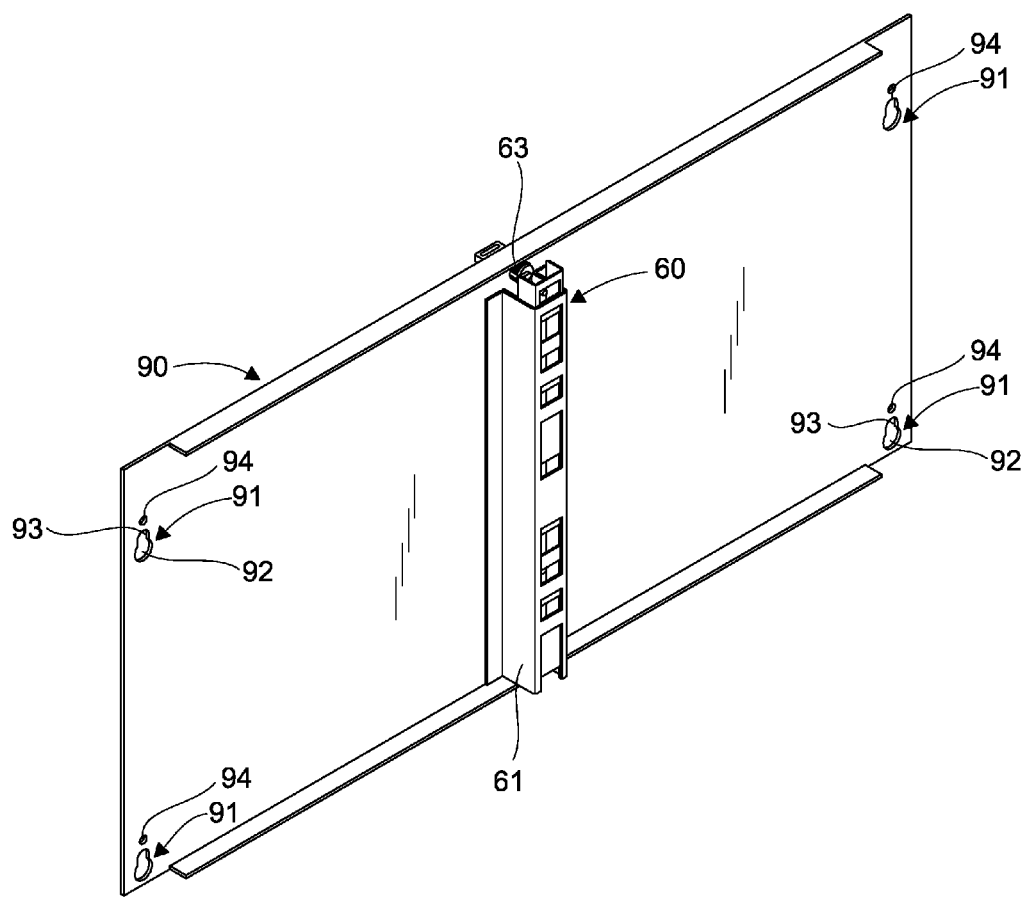
FIG. 20 is a perspective view of the rear panel and the lock assembly mounted thereon.
Figure 21:
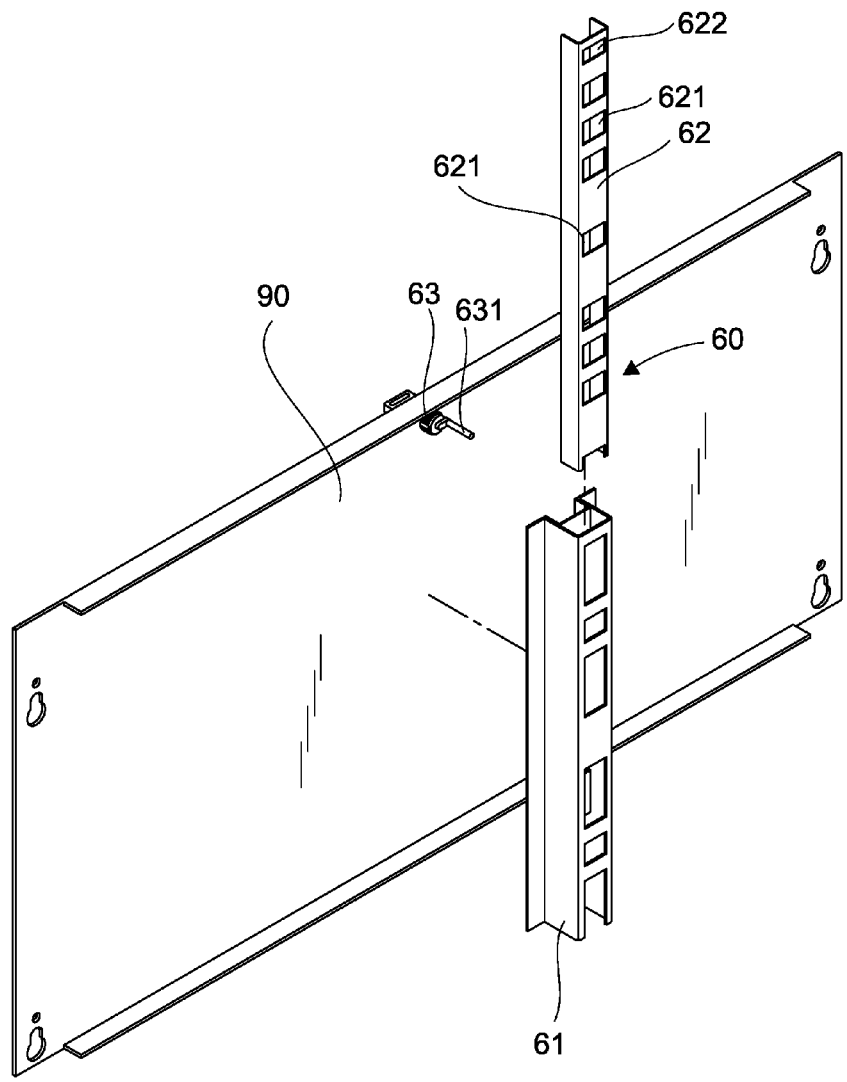
FIG. 21 is an exploded view of FIG. 20.
Figure 22:
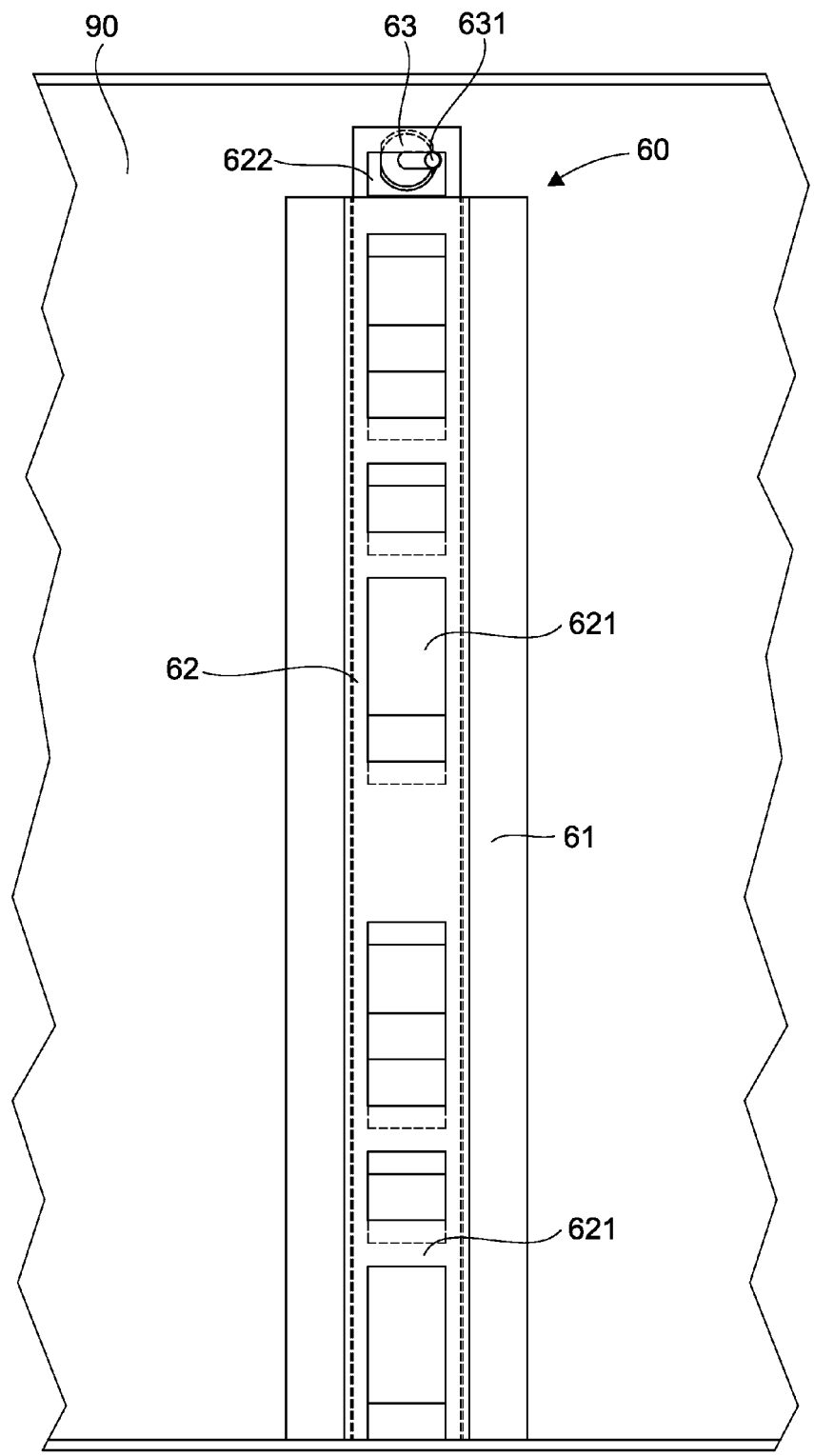
FIG. 22 is an enlarged plan view of FIG. 20 where the lock assembly is locked.
Figure 23:
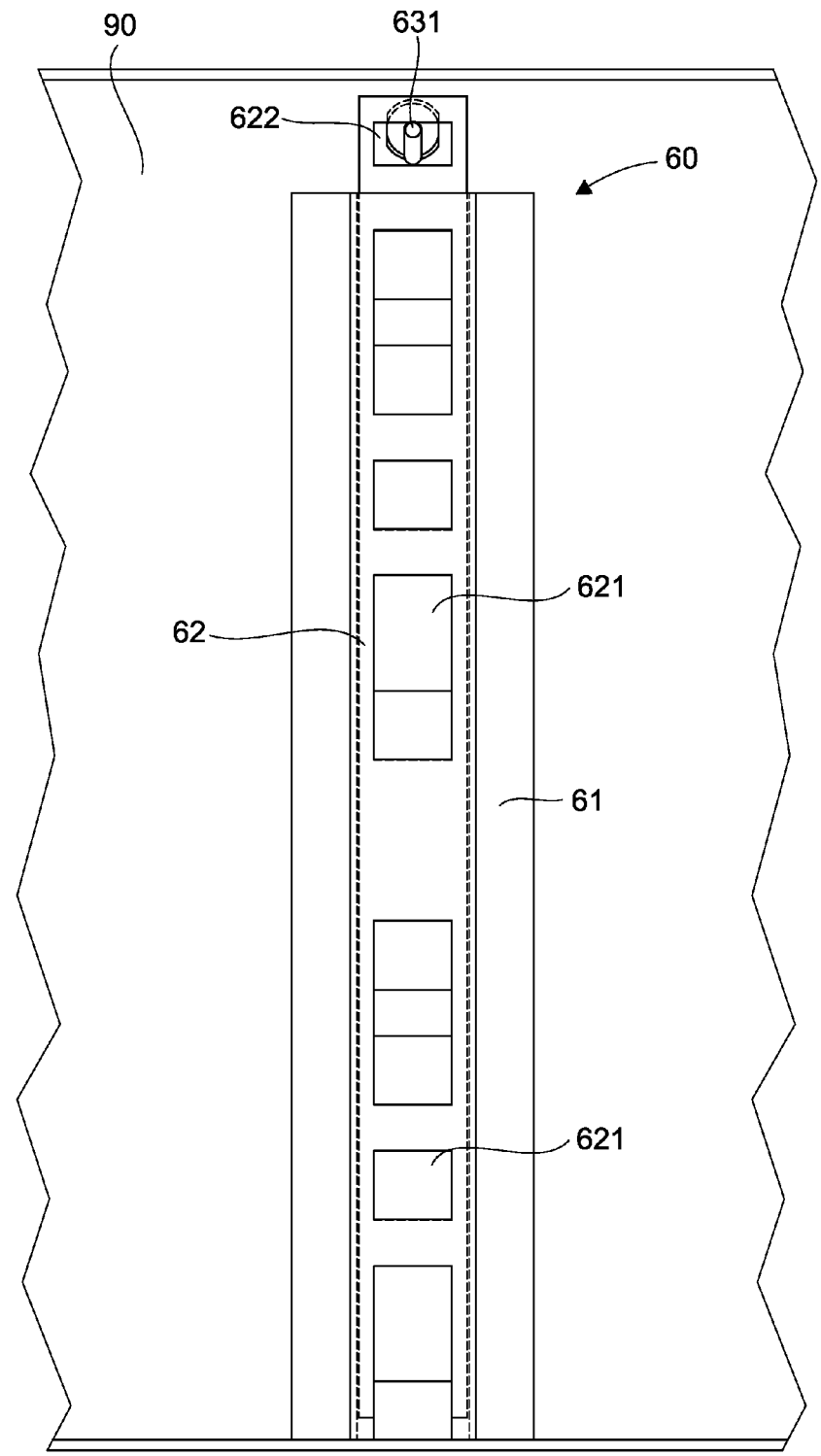
FIG. 23 is a view similar to FIG. 22 where the lock assembly is unlocked.

As shown in FIGS. 17, 18 and 19, in an assembly, the larger circle 13 is aligned with the third lower larger circle 92. Next, the retainer 30 is inserted through the third lower larger circle 92 and the larger circle 13 until the other enlargement 31 being stopped. Further, the retainer 30 is pressed down until the groove 32 is rested upon the smaller hole 14. Furthermore, the rear panel 90 is pressed down until the third upper smaller hole 93 tightly engages the trough 33. Next, the lock pin 40 is inserted into the larger circle 13 with the shaft 42 passing through the through hole 96 until being stopped. The ridge portion 421 urges against the third through hole 94 for fastening them together. Further, the head 41 of the lock pin 40 is partially disposed in the larger circle 13, and the concave portion 411 of the head 41 of the lock pin 40 is rested upon one enlargement 31 adjacent to the groove 32. As a result, the corner member 10 and the rear panel 90 are fastened together.

As shown in FIGS. 20 to 23, the lock assembly 60 is mounted on an inner surface of the rear panel 90 and includes an elongated, hollow sliding seat 61, an elongated, hollow lock member 62 having a plurality of apertures 621 disposed vertically on one surface, and a lock hole 622 above the top aperture 621, and a lock element 63 having an eccentric rod 631. The snapping member 97 is received in the aperture 621. The lock member 62 is shaped to complimentarily dispose in the sliding seat 61. In an operation, a key (not shown) is inserted into the lock element 63 to rotate the eccentric rod 631 to lift the lock hole 622 and the lock member 62 so that the snapping member 97 clears the aperture 621. As a result, the drawer 95 having the snapping member 97 is free to pull.

Figure 24:
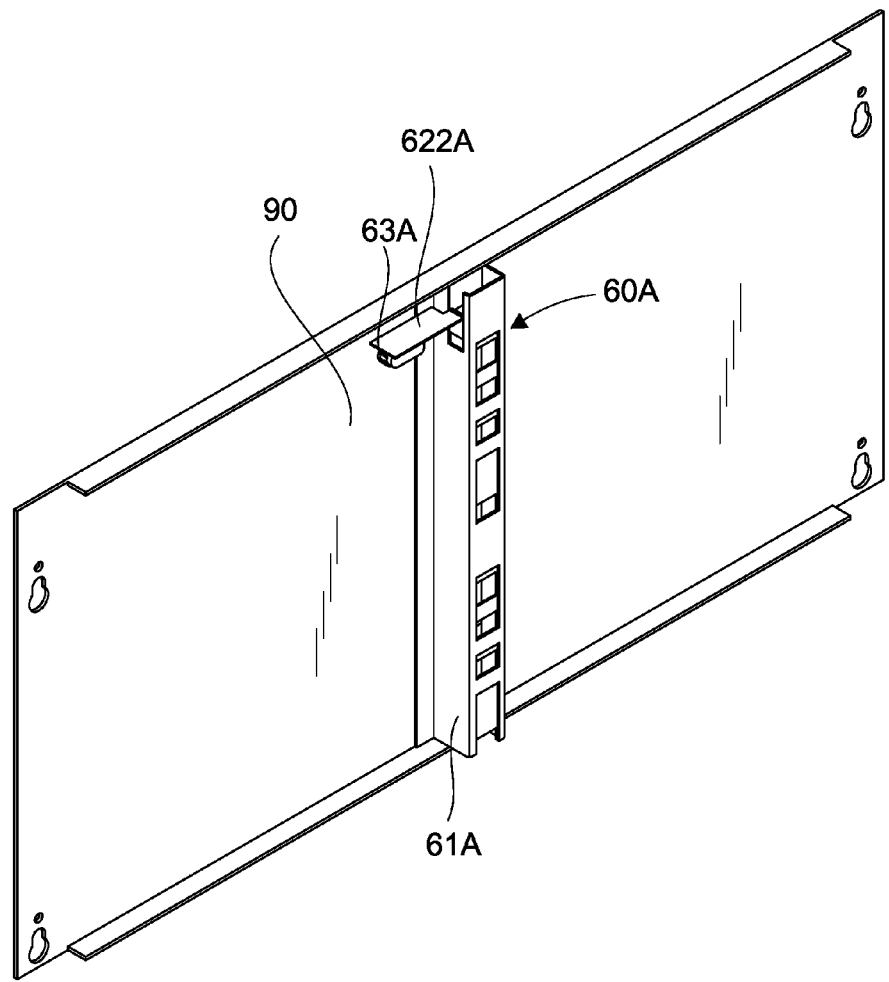
FIG. 24 is a perspective view of a rear panel and a lock assembly of a takedown utility cart according to a third preferred embodiment of the invention.
Figure 25:
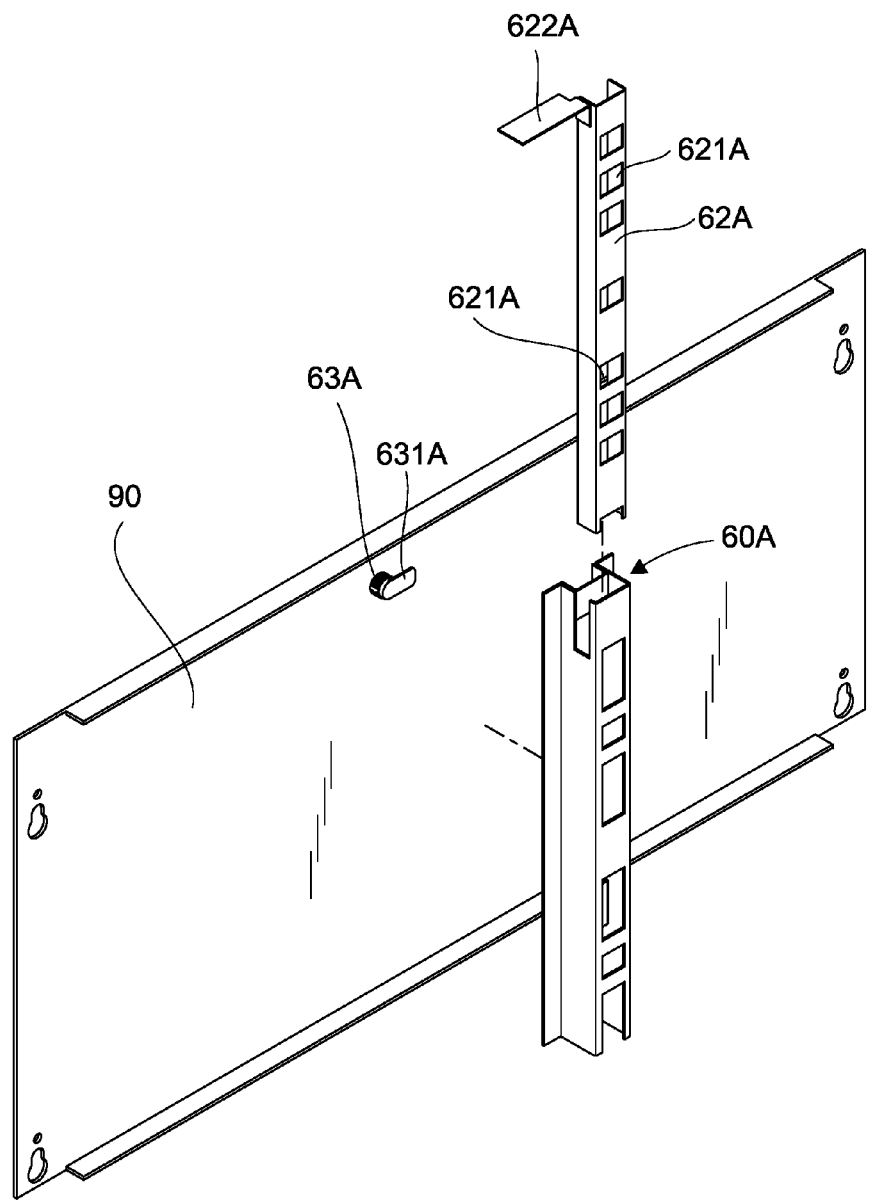
FIG. 25 is an exploded view of FIG. 24.
Figure 26:
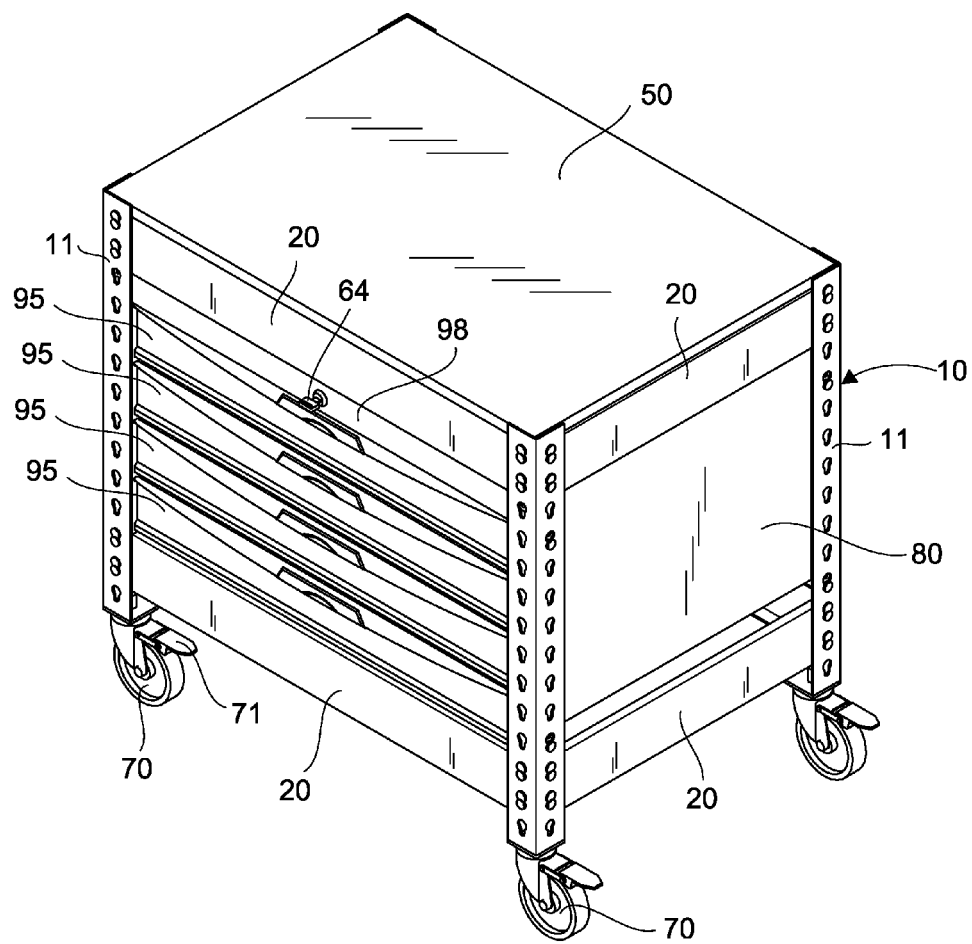
FIG. 26 is a perspective view of a takedown utility cart according to a fourth preferred embodiment of the invention.
Figure 27:
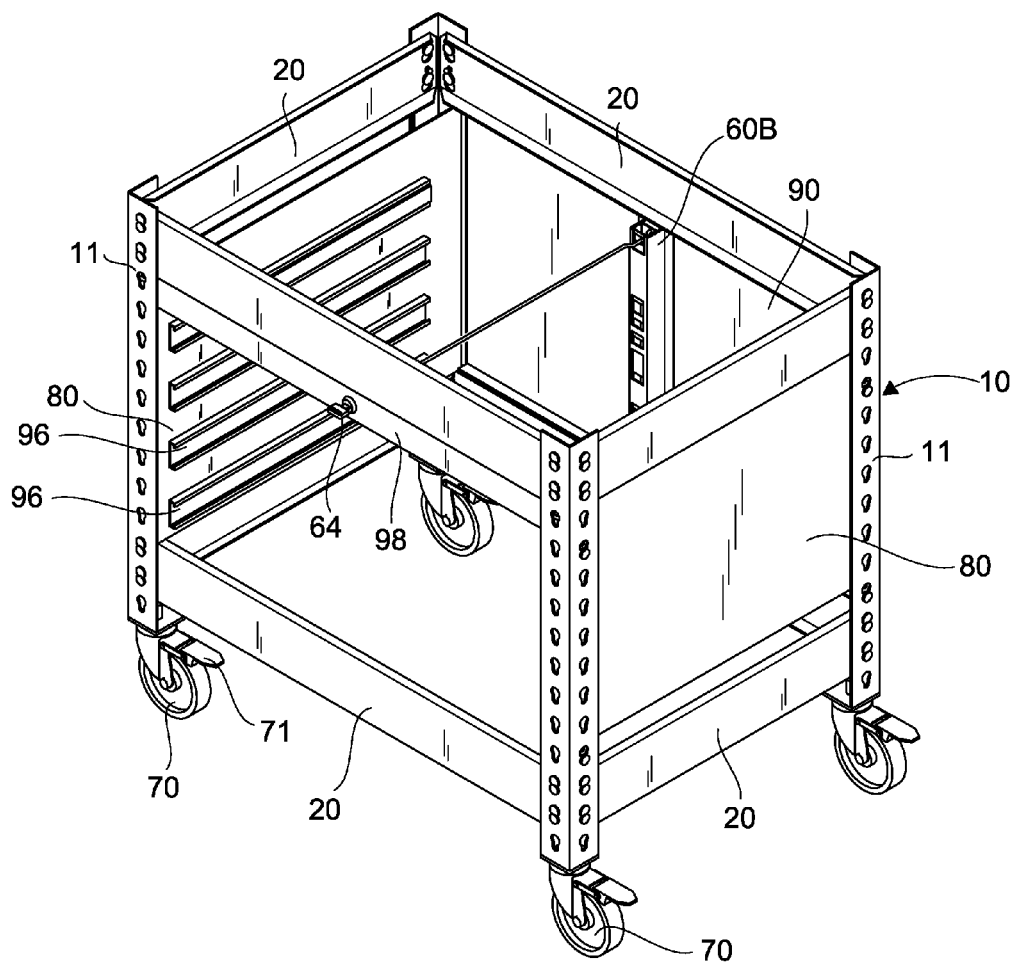
FIG. 27 is a perspective view of the takedown utility cart with the top platform and the drawers removed.
Figure 28:
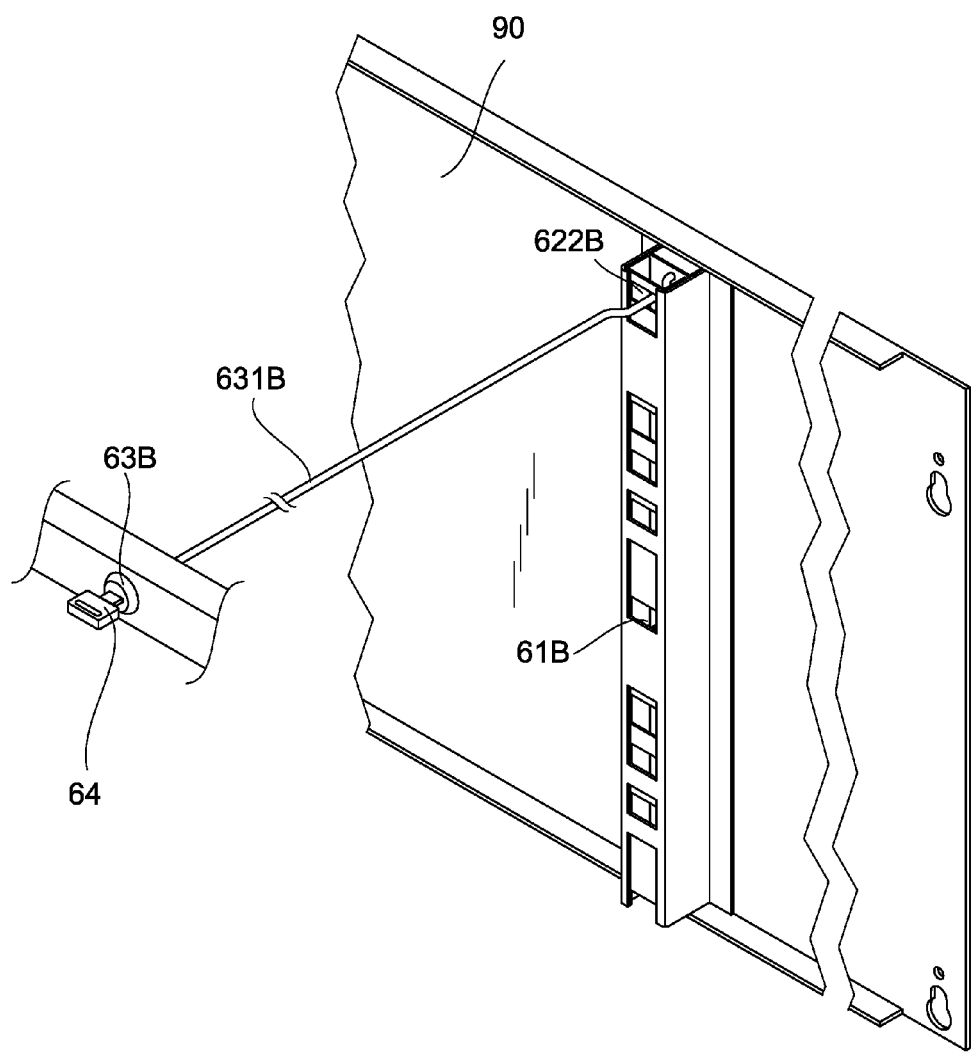
FIG. 28 is a perspective view schematically depicting the lock assembly of the takedown utility cart of the fourth preferred embodiment.
Figure 29:
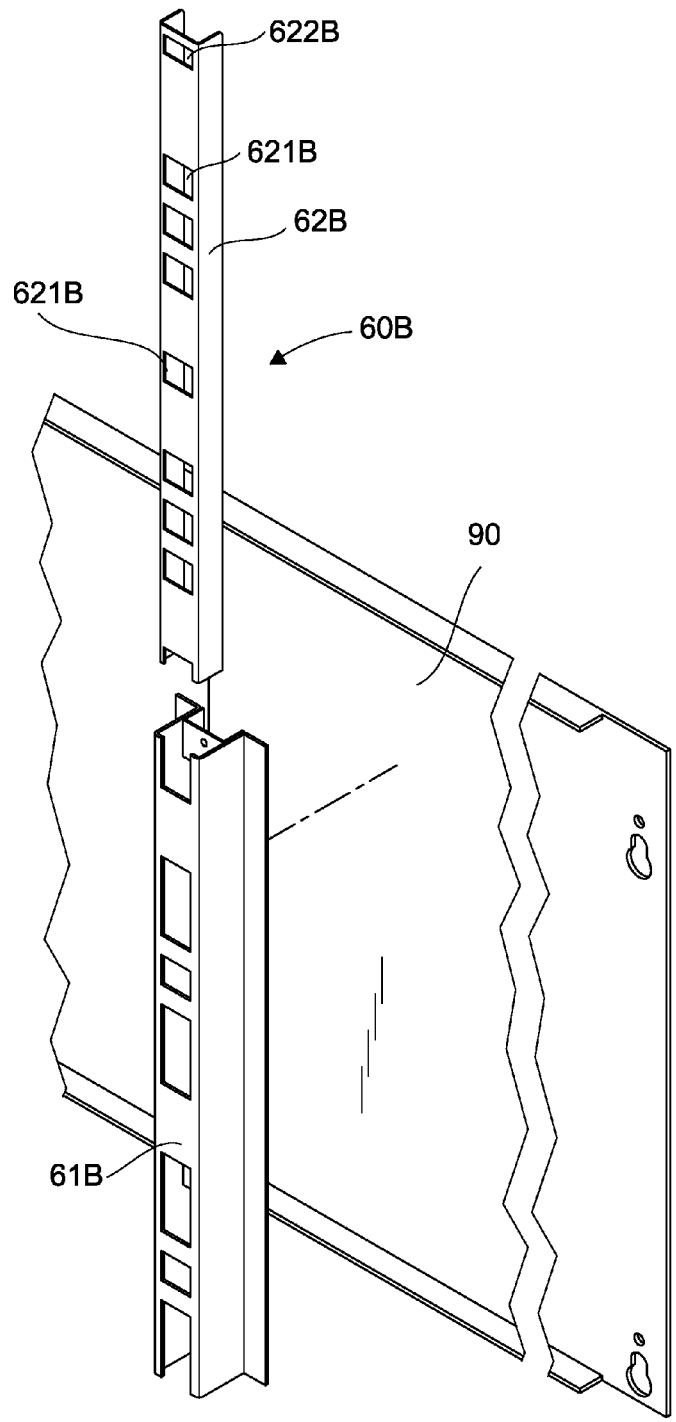
FIG. 29 is an exploded view of the lock assembly of the takedown utility cart of the fourth preferred embodiment and the rear panel.

Referring to FIGS. 24 and 25, a takedown utility cart in accordance with a third preferred embodiment of the invention is shown. The characteristics of the third preferred embodiment are substantially the same as that of the second preferred embodiment except the following: A lock assembly 60A includes an elongated, hollow sliding seat 61A, an elongated, hollow lock member 62A having a plurality of apertures 621A disposed vertically on one surface, and a laterally projecting stop member 622A above the top aperture 621A, and a lock element 63A having a lock lever 631A contacting a bottom of the stop member 622A. The lock member 62A is shaped to complimentarily dispose in the sliding seat 61A. In an operation, a key (not shown) is inserted into the lock element 63A to rotate the lock lever 631A to lift the stop member 622A and the lock member 62A so that the snapping member 97 clears the aperture 621A. As a result, the drawer 95 having the snapping member 97 is free to pull.

Referring to FIGS. 26 to 29, a takedown utility cart in accordance with a fourth preferred embodiment of the invention is shown. The characteristics of the fourth preferred embodiment are substantially the same as that of the second preferred embodiment except the following: A front panel 98 is provided between the front top interconnecting member 20 and the topmost drawer 50. Two ends of the front panel 98 are releasably secured to the supports 11 of the two front corner members 10 respectively. A lock assembly 60B includes an elongated, hollow sliding seat 61B, an elongated, hollow lock member 62B having a plurality of apertures 621B disposed vertically on one surface, and a lock hole 622B above the top aperture 621B, and a lock element 63B having a link 631B. The link 631B has a bent open end received in the lock hole 622B. The snapping member 97 is received in the aperture 621B. The lock member 62B is shaped to complimentarily dispose in the sliding seat 61B. An individual may insert a key 64 into the lock element 63B to rotate the link 631B which in turn lifts the stop member 622B and the lock member 62B so that the snapping member 97 clears the aperture 621B. As a result, the drawer 95 having the snapping member 97 is free to pull.

While the invention has been described in terms of preferred embodiments, those skilled in the art will recognize that the invention can be practiced with modifications within the spirit and scope of the appended claims.

What is claimed is:

1. A takedown utility cart comprising:
   four corner members (10) having an L-shaped cross-section, each corner member (10) including two supports (11) formed together, each support (11) having a plurality of spaced first joining apertures (12);
   a plurality of retainers (30);
   at least one set of four rectangular interconnecting members (20), each interconnecting member (20) being shaped as an elongated groove having two bent ends (25), each interconnecting member (20) including two second joining apertures (21) at two sides respectively wherein each retainer (30) is configured to drive through the first joining aperture (12) and the corresponding second joining aperture (21) to fasten the corner member (10) and the interconnecting member (20) together;
   two side walls (80) each including a rectangular panel (81), two joining members (82) at front and rear ends of the panel (81) respectively, and two third joining apertures (83) on the joining member (82) wherein each retainer (30) is configured to drive through the first joining aperture (12) and the corresponding third joining aperture (83) to fasten the corner member (10) and the side wall (80) together;
   at least one rectangular platform (50) each disposed on the bent ends (25) of the interconnecting members (20);
   at least one rectangular rear panel (90) each including four fourth joining apertures (91) at respective corners thereof wherein each retainer (30) is configured to drive through the first joining aperture (12) and the corresponding fourth joining aperture (91) to fasten the corner member (10) and the rear panel (90) together;
   at least one set of two slides (96) on inner surfaces of the side walls (80); and
   at least one drawer (95) each configured to slidably secure to the slides (96) of the same set;
   wherein the first joining aperture (12) includes an upper larger circle (13) and a lower smaller hole (14) overlapping the upper larger circle (13); the second joining aperture (21) includes a first upper smaller hole (23) aligned with the upper larger circle (13), and a first lower larger circle (22) overlapping the first upper smaller hole (23) and aligned with the lower smaller hole (14); size of the first upper smaller hole (23) is greater than that of the lower smaller hole (14); the third joining aperture (83) includes a second lower larger circle (84) and a second upper smaller hole (85) overlapping the second lower larger circle (84); size of the second upper smaller hole (85) is greater than that of the lower smaller hole (14); the fourth joining aperture (91) includes a third lower larger circle (92) and a third upper smaller hole (93) overlapping the third lower larger circle (92); and size of the third upper smaller hole (93) is greater than that of the lower smaller hole (14).

2. The takedown utility cart of claim 1, wherein the retainer (30) includes two enlargements (31) at two ends respectively, an annular groove (32) adjacent to one enlargement (31), and an annular trough (33) between the groove (32) and the other enlargement (31); the groove (32) is recessed further than the trough (33); in an assembly of the corner member (10) and the interconnecting member (20), the upper larger circle (13) is aligned with the first lower larger circle (22), the retainer (30) is inserted through the first lower larger circle (22) and the upper larger circle (13) until being stopped; the retainer (30) is pressed down until the groove (32) is rested upon the lower smaller hole (14); and the interconnecting member (20) is pressed down until the first upper smaller hole (23) fastens the trough (33); in an assembly of the corner member (10) and the side wall (80), the upper larger circle (13) is aligned with the second lower larger circle (84), the retainer (30) is inserted through the second lower larger circle (84) and the upper larger circle (13) until being stopped, the retainer (30) is pressed down until the groove (32) is rested upon the lower smaller hole (14), and the side wall (80) is pressed down until the second upper smaller hole (85) fastens the trough (33); and in an assembly of the corner member (10) and the rear panel (90), the upper larger circle (13) is aligned with the third lower larger circle (92), the retainer (30) is inserted through the third lower larger circle (92) and the upper larger circle (13) until being stopped, the retainer (30) is pressed down until the groove (32) is rested upon the lower smaller hole (14), and the rear panel (90) is pressed down until the third upper smaller hole (93) fastens the trough (33).

3. The takedown utility cart of claim 2, further comprising a plurality of lock pins (40) each including a curved head (41) having a concave portion (411) on an edge, and a shaft

(42) extending from the head (41), the shaft (42) having a diameter smaller than that of the head (41).

4. The takedown utility cart of claim 3, wherein the interconnecting member (20) further comprises a first through hole (24) above each second joining aperture (21), the first through hole (24) aligned with the upper larger circle (13); the shaft (42) passes through the first through hole (24) until being stopped; the head (41) is partially disposed in the upper larger circle (13); and the concave portion (411) is rested upon one enlargement (31) adjacent to the groove (32); the side wall (80) further comprises a second through hole (86) disposed above and adjacent to each second upper smaller hole (85), the second through hole (86) being aligned with the upper larger circle (13); the shaft (42) passes through the second through hole (86); the head (41) is partially disposed in the upper larger circle (13); and the concave portion (411) is rested upon one enlargement (31) adjacent to the groove (32); the rear panel (90) further comprises a third through hole (94) disposed above and adjacent to each second upper small hole (93), the third through hole (94) aligned with the upper larger circle (13); the shaft (42) is partially disposed in the third through hole (94); the head (41) is partially disposed in the upper larger circle (13); and the concave portion (411) is rested upon one enlargement (31) adjacent to the groove (32).

* * * * *